(12) United States Patent
Chassin et al.

(10) Patent No.: US 9,425,620 B2
(45) Date of Patent: Aug. 23, 2016

(54) NESTED, HIERARCHICAL RESOURCE ALLOCATION SCHEMA FOR MANAGEMENT AND CONTROL OF AN ELECTRIC POWER GRID

(75) Inventors: David P. Chassin, Pasco, WA (US); Robert G. Pratt, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 517 days.

(21) Appl. No.: 12/686,243

(22) Filed: Jan. 12, 2010

(65) Prior Publication Data
US 2010/0179862 A1 Jul. 15, 2010

Related U.S. Application Data

(60) Provisional application No. 61/143,954, filed on Jan. 12, 2009.

(51) Int. Cl.
*G06Q 10/00* (2012.01)
*G06Q 30/00* (2012.01)
(Continued)

(52) U.S. Cl.
CPC ............... *H02J 3/008* (2013.01); *G06Q 10/06* (2013.01); *G06Q 30/0215* (2013.01);
(Continued)

(58) Field of Classification Search
CPC ..................... G06Q 30/0206; G06Q 30/0283; G06Q 30/06; G06Q 50/06
USPC ..................................................... 705/1–412
See application file for complete search history.

(56) References Cited

U.S. PATENT DOCUMENTS

| 4,010,614 A | 3/1977 | Arthur |
| 5,572,438 A | 11/1996 | Ehlers et al. |

(Continued)

FOREIGN PATENT DOCUMENTS

| CA | 2678828 | 3/2010 |
| JP | 2008-204073 | 9/2008 |

(Continued)

OTHER PUBLICATIONS

Boyd et al., "Load Reduction, Demand Response, and Energy Efficient Technologies and Strategies," Pacific Northwest National Laboratory PNNL-18111, 44 pp. (Nov. 2008).

(Continued)

*Primary Examiner* — George Chen
(74) *Attorney, Agent, or Firm* — Klarquist Sparkman, LLP

(57) ABSTRACT

Disclosed herein are representative embodiments of methods, apparatus, and systems for distributing a resource (such as electricity) using a resource allocation system. In one exemplary embodiment, a system is disclosed comprising a first feeder network configured to deliver electrical power to a first plurality of customers. The first feeder network is controlled by a first market-based pricing system that computes a first feeder network price of electrical power at first periodic intervals. The system of this embodiment further comprises a second feeder network configured to deliver electrical power to a second plurality of customers. The second feeder network is controlled by a second market-based pricing system that computes a second feeder network price of electrical power at second periodic intervals. In this exemplary embodiment, the first feeder network and the second feeder network are part of a same distribution network, and the first feeder network price of electrical power is different than the second feeder network price of electrical power.

24 Claims, 11 Drawing Sheets

(51) Int. Cl.
*H02J 3/00* (2006.01)
*G06Q 10/06* (2012.01)
*G06Q 30/02* (2012.01)
*G06Q 40/04* (2012.01)
*G06Q 50/06* (2012.01)

(52) U.S. Cl.
CPC ..... *G06Q 30/0223* (2013.01); *G06Q 30/0282* (2013.01); *G06Q 40/04* (2013.01); *G06Q 50/06* (2013.01); *Y04S 10/58* (2013.01); *Y04S 50/10* (2013.01); *Y04S 50/14* (2013.01)

(56) References Cited

U.S. PATENT DOCUMENTS

| | | | |
|---|---|---|---|
| 5,684,710 A | 11/1997 | Ehlers et al. | |
| 5,696,695 A | 12/1997 | Ehlers et al. | |
| 5,924,486 A | 7/1999 | Ehlers et al. | |
| 6,216,956 B1 | 4/2001 | Ehlers et al. | |
| 6,343,277 B1 | 1/2002 | Gaus et al. | |
| 6,633,823 B2 | 10/2003 | Bartone et al. | |
| 6,681,156 B1 | 1/2004 | Weiss | |
| 6,895,325 B1 | 5/2005 | Munson, Jr. | |
| 6,963,854 B1 | 11/2005 | Boyd et al. | |
| 7,043,380 B2 | 5/2006 | Rodenberg et al. | |
| 7,085,739 B1 | 8/2006 | Winter et al. | |
| 7,130,719 B2 | 10/2006 | Ehlers et al. | |
| 7,135,956 B2 | 11/2006 | Bartone et al. | |
| 7,141,321 B2 | 11/2006 | McArthur et al. | |
| 7,243,044 B2 | 7/2007 | McCalla | |
| 7,249,169 B2* | 7/2007 | Blouin et al. | 709/220 |
| 7,343,226 B2 | 3/2008 | Ehlers et al. | |
| 7,343,360 B1 | 3/2008 | Ristanovic et al. | |
| 7,379,997 B2 | 5/2008 | Ehlers et al. | |
| 7,418,428 B2 | 8/2008 | Ehlers et al. | |
| 7,516,106 B2 | 4/2009 | Ehlers et al. | |
| 7,599,866 B2 | 10/2009 | Yan et al. | |
| 7,716,101 B2 | 5/2010 | Sandholm et al. | |
| 7,953,519 B2 | 5/2011 | Hamilton, II et al. | |
| 7,996,296 B2 | 8/2011 | Lange | |
| 8,126,794 B2 | 2/2012 | Lange et al. | |
| 8,271,345 B1 | 9/2012 | Milgrom et al. | |
| 8,504,463 B2 | 8/2013 | Johnson et al. | |
| 8,527,389 B2 | 9/2013 | Johnson et al. | |
| 8,577,778 B2 | 11/2013 | Lange et al. | |
| 2001/0032029 A1 | 10/2001 | Kauffman | |
| 2002/0038279 A1 | 3/2002 | Samuelson et al. | |
| 2002/0091626 A1 | 7/2002 | Johnson et al. | |
| 2002/0128747 A1 | 9/2002 | Mima | |
| 2002/0132144 A1 | 9/2002 | McArthur et al. | |
| 2002/0178047 A1 | 11/2002 | Or et al. | |
| 2003/0014379 A1 | 1/2003 | Saias et al. | |
| 2003/0023540 A2 | 1/2003 | Johnson et al. | |
| 2003/0036820 A1* | 2/2003 | Yellepeddy | G05B 15/02 700/291 |
| 2003/0040844 A1 | 2/2003 | Spool et al. | |
| 2003/0040845 A1 | 2/2003 | Spool et al. | |
| 2003/0041002 A1 | 2/2003 | Hao et al. | |
| 2003/0041016 A1 | 2/2003 | Spool et al. | |
| 2003/0041017 A1 | 2/2003 | Spool et al. | |
| 2003/0055774 A1 | 3/2003 | Ginsberg | |
| 2003/0078797 A1 | 4/2003 | Kanbara et al. | |
| 2003/0093332 A1 | 5/2003 | Spool et al. | |
| 2003/0093357 A1 | 5/2003 | Guler et al. | |
| 2003/0139939 A1 | 7/2003 | Spool et al. | |
| 2003/0144864 A1 | 7/2003 | Mazzarella | |
| 2003/0149672 A1 | 8/2003 | Laskoski | |
| 2003/0216971 A1 | 11/2003 | Sick et al. | |
| 2004/0010478 A1 | 1/2004 | Peljto et al. | |
| 2004/0015428 A2* | 1/2004 | Johnson | G06Q 10/04 705/37 |
| 2004/0024483 A1 | 2/2004 | Holcombe | |
| 2004/0128266 A1 | 7/2004 | Yellepeddy et al. | |
| 2004/0133529 A1 | 7/2004 | Munster | |
| 2004/0140908 A1 | 7/2004 | Gladwin et al. | |
| 2004/0153330 A1 | 8/2004 | Miller et al. | |
| 2004/0254688 A1 | 12/2004 | Chassin et al. | |
| 2005/0015283 A1 | 1/2005 | Iino et al. | |
| 2005/0027636 A1 | 2/2005 | Gilbert et al. | |
| 2005/0065867 A1 | 3/2005 | Aisu et al. | |
| 2005/0114255 A1* | 5/2005 | Shields et al. | 705/37 |
| 2005/0125243 A1* | 6/2005 | Villalobos | 705/1 |
| 2005/0137959 A1 | 6/2005 | Yan et al. | |
| 2005/0197875 A1 | 9/2005 | Kauffman | |
| 2005/0228553 A1 | 10/2005 | Tryon | |
| 2006/0036357 A1 | 2/2006 | Isono et al. | |
| 2006/0241951 A1 | 10/2006 | Cynamom et al. | |
| 2006/0259199 A1 | 11/2006 | Gjerde et al. | |
| 2006/0293980 A1 | 12/2006 | Corby et al. | |
| 2007/0011080 A1 | 1/2007 | Jain et al. | |
| 2007/0061248 A1 | 3/2007 | Shavit et al. | |
| 2007/0087756 A1 | 4/2007 | Hoffberg | |
| 2007/0124026 A1 | 5/2007 | Troxell et al. | |
| 2008/0021628 A1 | 1/2008 | Tryon | |
| 2008/0027639 A1 | 1/2008 | Tryon | |
| 2008/0039980 A1 | 2/2008 | Pollack et al. | |
| 2008/0046387 A1 | 2/2008 | Gopal et al. | |
| 2008/0051977 A1 | 2/2008 | Tryon | |
| 2008/0243664 A1 | 10/2008 | Shavit et al. | |
| 2008/0243682 A1 | 10/2008 | Shavit et al. | |
| 2008/0243719 A1 | 10/2008 | Shavit et al. | |
| 2008/0281663 A1 | 11/2008 | Hakim | |
| 2008/0297113 A1 | 12/2008 | Saeki et al. | |
| 2008/0300907 A1 | 12/2008 | Musier et al. | |
| 2008/0300935 A1 | 12/2008 | Musier et al. | |
| 2008/0306801 A1 | 12/2008 | Musier et al. | |
| 2008/0319893 A1 | 12/2008 | Mashinsky et al. | |
| 2009/0063228 A1 | 3/2009 | Forbes | |
| 2009/0132360 A1 | 5/2009 | Arfin et al. | |
| 2009/0177591 A1 | 7/2009 | Thorpe et al. | |
| 2009/0195349 A1 | 8/2009 | Frader-Thompson et al. | |
| 2009/0228151 A1 | 9/2009 | Wang et al. | |
| 2009/0307059 A1 | 12/2009 | Young et al. | |
| 2009/0313174 A1* | 12/2009 | Hafner et al. | 705/80 |
| 2010/0010939 A1 | 1/2010 | Arfin et al. | |
| 2010/0049371 A1 | 2/2010 | Martin | |
| 2010/0057625 A1 | 3/2010 | Boss et al. | |
| 2010/0106332 A1 | 4/2010 | Chassin et al. | |
| 2010/0106641 A1 | 4/2010 | Chassin et al. | |
| 2010/0107173 A1 | 4/2010 | Chassin | |
| 2010/0114387 A1 | 5/2010 | Chassin | |
| 2010/0121700 A1 | 5/2010 | Wigder et al. | |
| 2010/0179862 A1 | 7/2010 | Pratt et al. | |
| 2010/0216545 A1 | 8/2010 | Lange et al. | |
| 2010/0217550 A1 | 8/2010 | Crabtree et al. | |
| 2010/0218108 A1 | 8/2010 | Crabtree et al. | |
| 2010/0256999 A1 | 10/2010 | Ghani et al. | |
| 2010/0332373 A1 | 12/2010 | Crabtree et al. | |
| 2011/0015801 A1 | 1/2011 | Mazzarella | |
| 2011/0016055 A1 | 1/2011 | Mazzarella | |
| 2011/0081955 A1 | 4/2011 | Lange et al. | |
| 2011/0301964 A1 | 12/2011 | Conwell | |
| 2012/0022995 A1 | 1/2012 | Lange | |
| 2013/0325691 A1 | 12/2013 | Chassin et al. | |
| 2013/0325692 A1 | 12/2013 | Chassin et al. | |

FOREIGN PATENT DOCUMENTS

| | | |
|---|---|---|
| WO | WO 99/01822 | 1/1999 |
| WO | WO 02/23693 | 3/2002 |
| WO | WO 2007/065135 | 6/2007 |

OTHER PUBLICATIONS

Brambley, "Thinking Ahead: Autonomic Buildings," *ACEEE Summer Study on the Energy Efficiency in Buildings*, vol. 7, pp. 73-86 (2002).

Chassin et al., "Decentralized Coordination through Digital Technology, Dynamic Pricing, and Customer-Driven Control: The GridWise Testbed Demonstration Project," *The Electricity Journal*, vol. 21, pp. 51-59 (Oct. 2008).

Chassin et al., "Gauss-Seidel Accelerated: Implementing Flow Solvers on Field Programmable Gate Arrays," *IEEE Power Engineering Society General Meeting*, 5 pp. (Jun. 2006).

(56) References Cited

OTHER PUBLICATIONS

Chassin et al., "GridLAB-D: An open-source power systems modeling and simulation environment," *IEEE*, 5 pp. (Apr. 2008).
Chassin, "GridLAB-D Technical Support Document: Tape Modules Version 1.0," Pacific Northwest National Laboratory PNNL-17614, 8 pp. (May 2008).
Chassin, "GridLAB-D Technical Support Document: Commercial Modules Version 1.0," Pacific Northwest National Laboratory PNNL-17615, 8 pp. (May 2008).
Chassin, "GridLAB-D Technical Support Document: Network Module Version 1.0," Pacific Northwest National Laboratory PNNL-17616, 10 pp. (May 2008).
Chassin et al., "Modeling Power Systems as Complex Adaptive Systems," Pacific Northwest National Laboratory PNNL-14987, 151 pp. (Dec. 2004).
Chassin et al., "Project 2.6—Enhancement of the Whole-Building Diagnostician," Pacific Northwest National Laboratory PNNL-14383, 17 pp. (Aug. 2003).
Chassin, "The Abstract Machine Model for Transaction-based System Control," Pacific Northwest National Laboratory PNNL-14082, 28 pp. (Nov. 2002).
Chassin et al., "The pacific northwest demand response market demonstration," *IEEE*, 6 pp. (Jul. 2008).
Clearwater et al., "Thermal Markets for Controlling Building Environments," *Energy Engineering*, vol. 91, No. 3, pp. 26-56 (1994).
Fernandez et al., "Self Correcting HVAC Controls: Algorithms for Sensors and Dampers in Air-Handling Units," Pacific Northwest Laboratory PNNL-19104, 49 pp. (Dec. 2009).
Guttromson et al., "Residential energy resource models for distribution feeder simulation," *IEEE*, vol. 1, pp. 108-113 (Jul. 2003).
Hammerstrom et al., "Pacific Northwest GridWise Testbed Demonstration Projects: Part I. Olympic Peninsula Project," Pacific Northwest National Laboratory PNNL-17167, 157 pp. (Oct. 2007).
Hammerstrom et al., "Pacific Northwest GridWise Testbed demonstration Projects: Part II. Grid Friendly Appliance Project," Pacific Northwest National Laboratory PNNL-17079, 123 pp. (Oct. 2007).
Hammerstrom et al., "Standardization of a Hierarchical Transactive Control System," *Grid Interop Conf.*, 7 pp. (Nov. 2009).
Hatley et al., "Energy Management and Control System: Desired Capabilities and Functionality," Pacific Northwest National Laboratory PNNL-15074, 46 pp. (Apr. 2005).
Huang et al., "Transforming Power Grid Operations," *Scientific Computing*, vol. 45, No. 5, pp. 22-27 (Apr. 2007).
International Search Report dated Mar. 4, 2011, from International Patent Application No. PCT/US2010/020803, 4 pp.
Kannberg et al., "GridWise: The Benefits of a Transformed Energy System," Pacific Northwest National Laboratory PNNL-14396, 48 pp. (Sep. 2003).
Katipamula et al., "Evaluation of Residential HVAC Control Strategies for Demand Response Programs," *ASHRAE Trans., Symp. on Demand Response Strategies for Building Systems*, 12 pp (Jan. 2006).
Katipamula et al., "Transactive Controls: A Market-Based GridWise Controls for Building Systems," Pacific Northwest National Laboratory PNNL-15921, 14 pp. (Jul. 2006).
Kintner-Meyer et al., "Final Report for the Energy Efficient and Affordable Small Commercial and Residential Buildings Research Program—Project 3.3—Smart Load Control and Grid Friendly Appliances," Pacific Northwest National Laboratory PNNL-14342, 147 pp. (Jul. 2003).
Kok et al., "Agent-based Electricity Balancing with Distributed Energy Resources, A Multiperspective Case Study," *Proc. Hawaii Int'l Conf. on System Sciences*, 10 pp. (Jan. 2008).
Kok et al., "PowerMatcher: Multiagent Control in the Electricity Infrastructure," *AAMAS*, 8 pp. (Jul. 2005).
Lu et al., "A State-Queueing Model of Thermostatically Controlled Appliances," *IEEE Trans. on Power Systems*, vol. 19, No. 3, pp. 1666-1673 (Aug. 2004).

Lu et al., "Control Strategies of Thermostatically Controlled Appliances in a Competitive Electricity Market," *IEEE Proc. Power Engineering Society General Meeting*, pp. 202-207 (Jun. 2005).
Lu et al., "Grid Friendly Device Model Development and Simulation," Pacific Northwest National Laboratory PNNL-18998, 52 pp. (Nov. 2009).
Lu et al., "Modeling Uncertainties in Aggregated Thermostatically Controlled Loads Using a State Queueing Model," *IEEE Trans. on Power Systems*, vol. 20, No. 2, pp. 725-733 (May 2005).
Lu et al., "Simulating Price Responsive Distributed Resources," *IEEE*, vol. 3, pp. 1538-1543 (Oct. 2004).
Taylor et al., "GridLAB-D Technical Support Document: Residential End-Use Module Version 1.0," Pacific Northwest National Laboratory PNNL-17694, 30 pp. (Jul. 2008).
Written Opinion dated Mar. 4, 2011, from International Patent Application No. PCT/US2010/020803, 9 pp.
Chandley, "How RTOs Set Spot Market Prices (And How It Helps Keep the Lights On)," *PJM Interconnection*, 23 pp. (Sep. 2007).
Gatterbauer, "Interdependencies of Electricity Market Characteristics and Bidding Strategies of Power Producers," Master's Thesis, Massachusetts Institute of Technology, 33 pp. (May 2002).
Georgilakis, "Market Clearing Price Forecasting in Deregulated Electricity Markets Using Adaptively Trained Neural Networks," *Hellenic Conference on Artificial Intelligence*, vol. 3955, pp. 56-66 (2006).
Nicolaisen et al., "Market Power and Efficiency in a Computational Electricity Market With Discriminatory Double-Auction Pricing," ISU Economic Report No. 52, 26 pp. (Aug. 27, 2000; revised Aug. 24, 2001).
Pourebrahimi et al., "Market-based Resource Allocation in Grids," *IEEE Int'l Conf. on e-Science and Grid Computing*, 8 pp. (2006).
Hô et al., "Econophysical Dynamics of Market-Based Electric Power Distribution Systems," IEEE, pp. 1-6 (Jan. 2006).
Borenstein et al., "Diagnosing Market Power in California's Deregulated Wholesale Electricity Market," University of California Energy Institute, Power, PWP-064, 54 pp. (Aug. 2000).
Borenstein et al., "Diagnosing Market Power in California's Deregulated Wholesale Electricity Market," University of California Energy Institute, Power, PWP-064, 52 pp. (Mar. 2000).
Chassin, "Statistical Mechanics: A Possible Model for Market-based Electric Power Control", *Proc. of the 37th Hawaii Int'l Conf. on System Sciences*, 10 pp. (Jan. 2004).
Denholm et al., "An Evaluation of Utility System Impacts and Benefits of Optimally Dispatched Plug-In Hybrid Electric Vehicles," NREL Technical Report NREL/TP-620-40293, 30 pp. (Oct. 2006).
Denton et al., "Spot Market Mechanism Design and Competitivity Issues in Electric Power", *Proc. of the 31st Hawaii International Conference on System Sciences*, vol. 3, pp. 48-56 (Jan. 1998).
Gjerstad et al., "Price Formation in Double Auctions," *Games and Economic Behavior*, vol. 22, article No. GA970576, pp. 1-29 (1998). (Document marked as Received Nov. 30, 1995).
Green Car Congress, "PG&E and Tesla to Research Smart Recharging Vehicle-to-Grid Technology," downloaded from http://www.greencarcongress.com/2007/09/pge-and-tesla-t.html, 3 pp. (Sep. 12, 2007).
Kiesling, "Retail Electricity Deregulation: Prospects and Challenges for Dynamic Pricing and Enabling Technologies," The Searle Center Annual Review of Regulation, 44 pp. (May 2007).
LeMay et al., "An Integrated Architecture for Demand Response Communications and Control," *Hawaii Int'l Conf. on System Sciences*, 10 pp. (Jan. 2008).
Lu et al., "Design Considerations for Frequency Responsive Grid Friendly Appliances," *IEEE PES Trans. and Distribution Conference and Exhibition*, 6 pp. (May 2006).
Lu et al., "Reputation-Aware Transaction Mechanisms in Grid Resource Market," *IEEE Sixth Int'l Conf. on Grid and Cooperative Computing*, 6 pp. (Aug. 2007).
Nanduri et al., "A Methodology for Evaluating Auction Based Pricing Strategies in Deregulated Energy Markets," Working Paper, 12 pp. (2005).

(56) References Cited

OTHER PUBLICATIONS

Nanduri, et al., "A Reinforcement Learning Model to Assess Market Power Under Auction-Based Energy Pricing," *IEEE Trans. on Power Systems*, vol. 22, No. 1, pp. 85-95 (Feb. 2007).

Pratt et al., "Potential Impacts of High Penetration of Plug-in Hybrid Vehicles on the U.S. Power Grid," DOE/EERE PHEV Stakeholder Workshop, 14 pp. (Jun. 2007).

Satayapiwat et al., "A Utility-based Double Auction Mechanism for Efficient Grid Resource Allocation," *Int'l Symp. on Parallel and Distributed Processing with Applications* (ISPA '08), pp. 252-260 (Dec. 10-12, 2008).

Schneider et al., "A Taxonomy of North American Radial Distribution Feeders," *IEEE Power & Energy Society General Meeting*, 6 pp. (Jul. 2009).

Schneider et al., "Distribution Power Flow for Smart Grid Technologies," *IEEE/PES Power System Conference and Exhibition*, 7 pp. (Mar. 2009).

Schneider et al., "Modern Grid Strategy: Enhanced GridLAB-D Capabilities Final Report," Pacific Northwest National Laboratory PNNL-18864, 30 pp. (Sep. 2009).

Schneider et al., "Voltage Control Devices on the IEEE 8500 Node Test Feeder," *IEEE PES Transmission & Distribution Conference & Exposition*, 6 pp. (Apr. 2010).

Yin et al., "A Novel Double Auction Mechanism for Electronic Commerce: Theory and Implementation," *IEEE Proc. of the Third Int'l Conf. on Machine Learning and Cybernetics*, pp. 53-58 (Aug. 2004).

Plott et al., "Instability of Equilibria in Experimental Markets: Upward-sloping Demands, Externalities, and Fad-like Incentives," *Southern Economic Journal*, vol. 65 (3), 23 pp. (Jan. 1999).

Examiner's Report from the Canadian Intellectual Property Office for Canadian Application No. 2,749,373, dated Jan. 6, 2016, 5 pages.

\* cited by examiner

NESTED, HIERARCHICAL RESOURCE ALLOCATION SCHEMA FOR MANAGEMENT AND CONTROL OF AN ELECTRIC POWER GRID

CROSS REFERENCE TO RELATED APPLICATION

This application claims the benefit of U.S. Provisional Application No. 61/143,954 filed on Jan. 12, 2009, and entitled "NESTED, HIERARCHICAL RESOURCE ALLOCATION SCHEMA FOR MANAGEMENT AND CONTROL OF AN ELECTRIC POWER GRID," which is hereby incorporated herein by reference in its entirety.

FIELD

This application relates generally to the field of power grid management and control.

BACKGROUND

The demand for electricity is expected to continue its historical growth trend far into the future. To meet this growth with traditional approaches would require adding power generation, transmission, and distribution that may cost in the aggregate up to $2,000/kW on the utility side of the meter. The amount of capacity in generation, transmission, and distribution generally must meet peak demand and must provide a reserve margin to protect against outages and other contingencies. The nominal capacity of many power-grid assets is typically used for only a few hundred hours per year. Traditional approaches for maintaining the adequacy of the nation's power generation and delivery system are characterized by sizing system components to meet peak demand, which occurs only a few hours during the year. Thus, overall asset utilization remains low, particularly for assets located near the end-user in the distribution portion of the system.

The increased availability of energy-information technologies can play an important role in addressing the asset utilization issue cost-effectively. It has been estimated that $57 billion savings could be realized by applying smart technologies throughout the nation's electric generation, transmission, and distribution systems over the next 20 years.

Accordingly, there is a need for improved power distribution systems and techniques that allow larger portions of the demand-side infrastructure to function as an integrated system element. For example, there is a need for systems and methods that enable end-use electrical devices and/or consumers to actively participate in grid control.

SUMMARY

Disclosed below are representative embodiments of methods, apparatus, and systems for distributing a resource (such as electricity).

In one disclosed embodiment, a plurality of requests for electrical power is received from a corresponding plurality of electrical-power users. The electrical-power users receive electrical power through a feeder network controlled by a transmission node, and each of the requests indicates a requested quantity of electrical power and a requested price for the requested quantity of electrical power. One or more offers for supplying electrical power to the feeder network are also received. The plurality of offers is from a corresponding plurality of resource suppliers, and each of the offers indicates an offered quantity of electrical power and an offered price for the requested quantity of electrical power. A price at which electrical power is to be supplied to the consumers on the feeder network is determined based at least in part on the requested prices and the offered prices, the price being unique to the feeder network. In some implementations, one or more of the offers for supplying electrical power and/or one or more of the requests for electrical power are from one or more other transmission nodes. In some implementations, an offer to supply electrical power or a request for electrical power is transmitted to one or more other transmission nodes. In certain implementations, one or more of the offers for supplying electrical power are from power resources in one or more electrical vehicles. In certain implementations, one or more of the offers for supplying electrical power are associated with reserve power generators connected to the transmission node. In some implementations, one or more of the requests for electrical power are associated with price-responsive electrical devices. In certain implementations, the transmission node is one of a plurality of transmission nodes in a distribution network. In some implementations, the feeder network is a first feeder network, the transmission node is a first transmission node, and the price is a first price. In these implementations, the method can further comprise determining a second price at which electrical power is to be supplied to other consumers on a second feeder network, the second feeder network being part of the same distribution network, and the second price being unique to the second distribution network. In certain implementations, the acts of receiving the plurality of requests, receiving the plurality of offers, and determining a price are repeated at periodic intervals (e.g., periodic intervals of 10 minutes or less, such as periodic intervals of 5 minutes). In some implementations, the method can further comprise transmitting a bid for electrical power to a higher-order transmission node, the bid indicating a quantity of power to be supplied to the electrical-power users and a requested price for the quantity of power. In certain implementations, the periodic intervals are first periodic intervals, and the act of transmitting the bid for electrical power to the higher-order transmission node is repeated at second periodic intervals, the second periodic intervals being longer than the first periodic intervals. In some implementations, the method further comprises transmitting the price to at least one of the consumers or resource suppliers.

In another disclosed embodiment, a system is disclosed comprising a first feeder network configured to deliver electrical power to a first plurality of customers, the first feeder network being controlled by a first market-based pricing system that computes a first feeder network price of electrical power at first periodic intervals. The system of this embodiment further comprises a second feeder network configured to deliver electrical power to a second plurality of customers, the second feeder network being controlled by a second market-based pricing system that computes a second feeder network price of electrical power at second periodic intervals. In this embodiment, the first feeder network and the second feeder network are part of a same distribution network, and the first feeder network price of electrical power is different than the second feeder network price of electrical power. In certain implementations, the first market-based pricing system is configured to transmit bids requesting electrical power or offers to sell electrical power to the second market-based pricing system during the first periodic intervals. In some implementations, the first market-based pricing system is configured to receive bids requesting electrical power or offers to sell electrical power from the second market-based pricing system during the first periodic intervals. In certain implementations, the first periodic intervals and the second periodic intervals are synchronous. In some implementations, the first periodic intervals and the second periodic intervals are 10 minutes or less, such as 5 minutes. In certain implementations, the first feeder network is served by a first distribution substation, and the second feeder network is served by a second distribution substation. In some implementations, the system further comprises a transmission network configured to transmit power to the first feeder network and the second feeder network, the transmission network being controlled by a third market-based pricing system that computes a transmission network price of electrical power at third periodic intervals, the third periodic intervals being longer than the first periodic intervals and the second periodic intervals. In certain implementations, the transmission network is further configured to transmit regulation power to the first feeder network and the second feeder network, and the regulation power transmitted by the transmission network is controlled by a fourth market-based pricing system that computes a price of regulation power at fourth periodic intervals, the fourth periodic intervals being shorter than the second periodic intervals. In some implementations, the third market-based pricing system is configured to receive bids for energy from the first feeder network and the second feeder network, receive offers for energy from one or more power suppliers (e.g., one or more of a merchant generator, a utility with power generation capabilities, or another transmission node with excess power), and determine the transmission network price of electrical power during the third periodic intervals based at least in part on the bids and the offers.

In another disclosed embodiment, a price at which electrical power is to be supplied to consumers on a distribution network is determined for each of a first series of time intervals. The time intervals of the first series have a first interval duration. In this embodiment, a bid for electrical power for each of a second series of time intervals is also determined. The time intervals of the second series have a second interval duration that is different than the first interval duration. In certain implementations, the second interval duration is longer than the first interval duration. In some implementations, the bid for electrical power for a selected one of the second series of time intervals is based on a bid for electrical power during a corresponding interval from the previous day. In certain implementations, the bid for electrical power for a selected one of the second series of time intervals includes a request for a quantity of electrical power sufficient to supply electrical power to the consumers on the distribution network during a future time interval of the first series (e.g., a time interval in a following day). In some implementations, the bid is a first bid, and the method further comprises determining a second bid for energy to be supplied at a time interval that is subsequent to the future time interval of the first series. In particular implementations, the second bid is in units of energy. In some implementations, the price is a first price, and the method further comprises using a first market-based pricing system to determine the first price, and using a second market-based pricing system to determine a second price for the electrical power for each of the second series of time intervals.

In another disclosed embodiment, a plurality of requests for electrical power associated with a transmission node is received. Each of the requests indicates a requested quantity of electrical power and a requested price for the requested quantity of electrical power. In the disclosed embodiment, one or more offers for supplying electrical power to the transmission node are received. Each of the offers indicates an offered quantity of electrical power and an offered price for the requested quantity of electrical power. In the disclosed embodiment, data indicative of amounts of power the transmission node can deliver or withdraw across a range of prices is determined, the data being based on the received requests and offers. In certain implementations, the data is an injection-withdrawal curve. In some implementations, an iterative process is used to adjust the integrated injection-withdrawal curve until a net power mismatch between the transmission node and the other transmission nodes is within a predetermined tolerance of zero. In some implementations, the iterative process is a Gauss-Seidel process. In certain implementations, the data is transmitted to one or more other transmission nodes, and other data from the one or more other transmission nodes is received, the other data being indicative of amounts of power that the one or more other transmission nodes can deliver or withdraw across a range of prices. In some implementations, one or more net power flow values are computed based at least in part on the other data. In certain implementations, the data is adjusted based at least in part on the one or more net power flow values. In certain implementations, the adjusted data is transmitted to the one or more other transmission nodes, and other adjusted data is received from the one or more other transmission nodes. In some implementations, the acts of computing the one or more net power values, adjusting the data, transmitting the adjusted data, and receiving the other adjusted data are iteratively repeated until the net power flow values are within a predetermined range of value.

In another disclosed embodiment, a method for controlling electrical distribution is disclosed. The method of this embodiment comprises operating two or more nodal transmission markets. In particular implementations, the act of operating the two or more nodal transmission markets comprises balancing supply offers and demands at transmission nodes corresponding to each of the nodal transmission markets. In certain implementations, at least one of the transmission nodes comprises an intersection of at least two transmission lines, an intersection of a transmission line with a generator, or a distribution substation. In some implementations, the act of operating the two or more nodal transmission markets comprises allowing the transmission nodes to submit offers and demands with each other. In certain implementations, the act of operating the two or more nodal transmission markets comprises constructing an integrated injection-withdrawal curve. In some implementations, the act of operating the two or more nodal transmission markets further comprises adjusting the integrated injection-withdrawal by comparing local demand at a selected one of the nodal transmission markets with a global value.

In another disclosed embodiment, a desired mixture of electrical-power customer payment plans and a current mixture of electrical-power customer payment plans are determined. In this embodiment, one or more customer incentives are determined based on the difference between the desired mixture of electrical-power customer payment plans and the current mixture of electrical-power customer payment plans. In some implementations, at least one of the customer payment plans is a plan in which prices are computed during each of a plurality of intervals throughout a day using a market-based pricing system. In certain implementations, the one or more customer incentives are designed to cause customers to change payment plans in accordance with the desired mixture of electrical-power customer payment plans. In some implementations, the method further comprises providing the customer incentives to customers by providing a credit to customers who use customer payment plans that help achieve the desired mixture of electrical-power customer payment plans. In certain implementations, the method further comprises providing the customer incentives to customers by charging a fee to customers who use customer payment plans that do not help achieve the desired mixture of electrical-power customer payment plans. In some implementations, the act of determining a desired mixture of electrical-power customer payment plans comprises receiving data indicative of one or more business objectives for an electrical power utility, and computing the desired mixture of electrical-power customer payment plans so that customer payment plans that achieve the one or more business objectives are increased. In certain implementations, the one or more business objectives include reducing imbalance-energy costs, reducing energy costs, increasing net revenue, increasing asset utilization, and reducing carbon emissions.

Embodiments of the disclosed methods can be performed using computing hardware, such as a computer processor or an integrated circuit. For example, embodiments of the disclosed methods can be performed by software stored on one or more non-transitory computer-readable media (e.g., one or more optical media discs, volatile memory components (such as DRAM or SRAM), or nonvolatile memory or storage components (such as hard drives)). Such software can be executed on a single computer or on a networked computer (e.g., via the Internet, a wide-area network, a local-area network, a client-server network, or other such network). Embodiments of the disclosed methods can also be performed by specialized computing hardware (e.g., one or more application specific integrated circuits (ASICs) or programmable logic devices (such as field programmable gate arrays (FPGAs)) configured to perform any of the disclosed methods). Additionally, any intermediate or final result created or modified using any of the disclosed methods can be stored on a non-transitory storage medium (e.g., one or more optical media discs, volatile memory or storage components (such as DRAM or SRAM), or nonvolatile memory or storage components (such as hard drives)). Furthermore, any of the software embodiments (comprising, for example, computer-executable instructions for causing a computer to perform any of the disclosed methods), intermediate results, or final results created or modified by the disclosed methods can be transmitted, received, or accessed through a suitable communication means.

The foregoing and other objects, features, and advantages of the disclosed technology will become more apparent from the following detailed description, which proceeds with reference to the accompanying figures.

DETAILED DESCRIPTION

I. General Considerations

Figure 1:
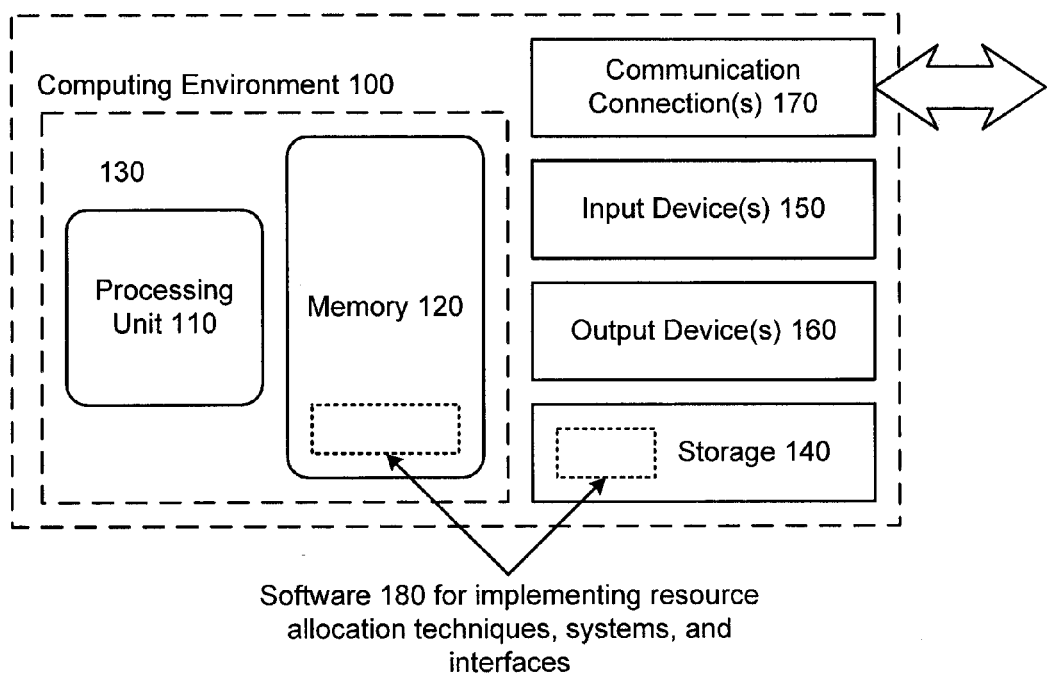
FIG. 1 is a schematic block diagram of a computing hardware architecture that can be used to perform embodiments of the disclosed technology.

Disclosed below are representative embodiments of methods, apparatus, and systems for distributing a resource (such as electricity) using a nested, hierarchical resource allocation system. The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "generate" to describe the disclosed methods. These terms are high-level abstractions of the actual operations that are performed. The actual operations that correspond to these terms may vary depending on the particular implementation and are readily discernible by one of ordinary skill in the art.

Any of the disclosed methods can be implemented using computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer). Any of the computer-executable instructions for implementing the disclosed techniques (e.g., the disclosed bid generation, offer generation, or price generation techniques) as well as any intermediate or final data created and used during implementation of the disclosed resource allocation systems can be stored on one or more computer-readable media (e.g., non-transitory computer-readable media). The computer-executable instructions can be part of, for example, a dedicated software application or a software application that is accessed or downloaded via a network (e.g., through a web browser). More specifically, such software can be executed on a single computer (e.g., any suitable commercially available computer) or in a network environment (e.g., via the Internet, a wide-area network, a local-area network, a client-server network, or other such network).

For clarity, only certain selected aspects of the software-based embodiments are described. Other details that are well known in the art are omitted. For example, it should be understood that the software-based embodiments are not limited to any specific computer language or program. For instance, embodiments of the disclosed technology can be implemented by software written in C++, Java, Perl, JavaScript, Adobe Flash, or any other suitable programming language. Likewise, embodiments of the disclosed technology are not limited to any particular computer or type of hardware. Details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to an electrical device (or element) that is configured to interact with the resource allocation system. For example, the integrated circuit can be embedded in or otherwise coupled to a generator (e.g., a wind-based generator, solar-based generator, coal-based generator, or nuclear generator), an air-conditioning unit; heating unit; heating, ventilation, and air conditioning ("HVAC") system; hot water heater; refrigerator; dish washer; washing machine; dryer; oven; microwave oven; pump; home lighting system; electrical charger, electric vehicle charger; or home electrical system.

FIG. 1 illustrates a generalized example of a suitable computing hardware environment 100 in which several of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing unit 110 and memory 120. In FIG. 1, this most basic configuration 130 is included within a dashed line. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 implementing one or more of the described techniques for operating or using the disclosed resource allocation systems. For example, the memory 120 can store software 180 for implementing any of the disclosed price determination, bidding, or offer strategies described herein and their accompanying user interfaces.

The computing environment can have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other tangible non-transitory storage medium which can be used to store information and which can be accessed within the computing environment 100. The storage 140 can also store instructions for the software 180 implementing any of the described techniques, systems, or environments.

The input device(s) 150 can be a touch input device such as a keyboard, mouse, touch screen, pen, trackball, a voice input device, a scanning device, or another device that provides input to the computing environment 100. The output device(s) 160 can be a display, printer, speaker, CD-writer, or another device that provides output from the computing environment 100.

The communication connection(s) 170 enable communication over a communication medium to another computing entity. The communication medium conveys information such as computer-executable instructions, resource allocation messages or data, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The various methods, systems, and interfaces disclosed herein can be described in the general context of computer-executable instructions stored on one or more computer-readable media. Computer-readable media are any available media that can be accessed within or by a computing environment. By way of example, and not limitation, with the computing environment 100, computer-readable media include tangible non-transitory computer-readable media such as memory 120 and storage 140. The various methods, systems, and interfaces disclosed herein can also be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

Figure 2:
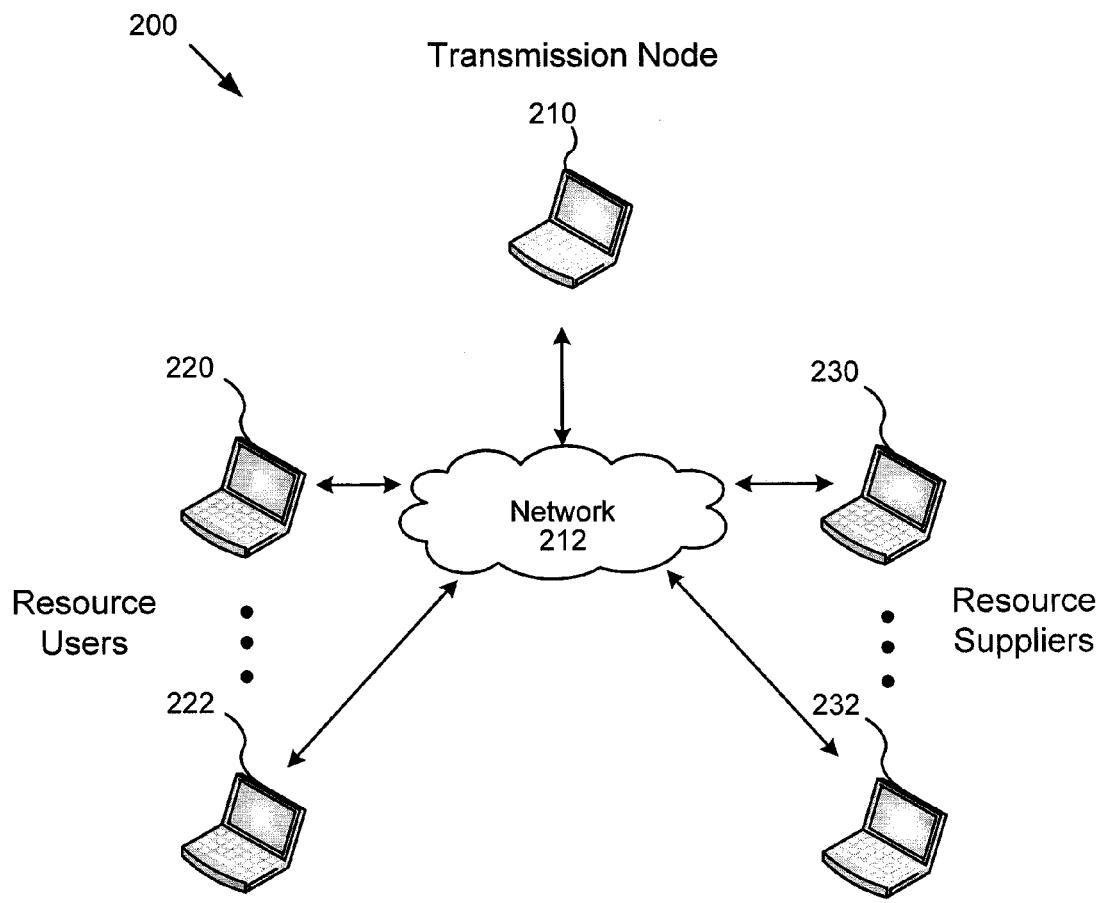
FIG. 2 is a schematic block diagram of a network topology in which embodiments of the disclosed technology can be performed.

An example of a possible network topology for implementing a resource allocation system according to the disclosed technology is depicted in FIG. 2. Networked computing devices 220, 222, 230, 232 can be, for example, computing devices having computing hardware that runs software or is otherwise configured to communicate with a computing device 210 at a transmission node whose associated electrical transmission network serves or is served by the electrical loads or resources associated with the computing devices 220, 222, 230, 232. (As more fully explained below, the transmission node can be, for example, at a location where two or more transmission lines intersect, where a transmission line intersects with a generator, or where a transmission line intersects with a load serving point. For instance, the transmission node can be at a distribution substation, a sub-transmission substation, a transmission substation, or other such nodal locale.)

The computing devices 220, 222, 230, 232 and the transmission node computing device 210 can have computer architectures as shown in FIG. 1 and discussed above. The computing devices 220, 222, 230, 232 are not limited to traditional personal computers but can comprise other computing hardware configured to connect to and communicate with a network 212 (e.g., specialized computing hardware associated with an electrical device or a power generator (e.g., hardware comprising an integrated circuit (such as an ASIC or programmable logic device) configured to perform any of the disclosed methods)).

In the illustrated embodiment, the one or more computing devices 220, 222, 230, 232 are configured to connect to one or more transmission node computing devices 210. In certain implementations, the transmission node computing device 210 receives resource bids or requests from those computing devices associated with resource users (e.g., devices 220, 222) and receives resource offers from those computing devices associated with resource suppliers (e.g., devices 230, 232). The one or more transmission node computing devices 210 then compute a price at which the resource is to be dispatched and transmit this price to the computing devices 220, 222, 230, 232. As more fully explained below, this process can be repeated at fixed intervals (e.g., intervals of 10 minutes or less, such as intervals of 5 minutes).

In the illustrated embodiment, the transmission node computing devices 210 are accessed over a network 212, which can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). In certain embodiments, at least part of the network 212 can be the Internet or a similar public network. The one or more transmission node computing devices 210 can be located at the transmission node itself (e.g., in the distribution substation, sub-transmission substation, transmission substation, or other nodal locale) or can alternatively be located remotely from the transmission node (e.g., at a centralized location, such as a central computing device that performs computations for multiple transmission nodes, or other locations).

The various possible roles and functionalities of the computing devices 220, 222, 230, 232 and the one or more transmission node computing devices 210 will be described in more detail in the following sections.

II. General Embodiments of the Disclosed Resource Allocation Schemes

A. General Case of a Nested, Hierarchical Resource Allocation Schema

Figure 3:
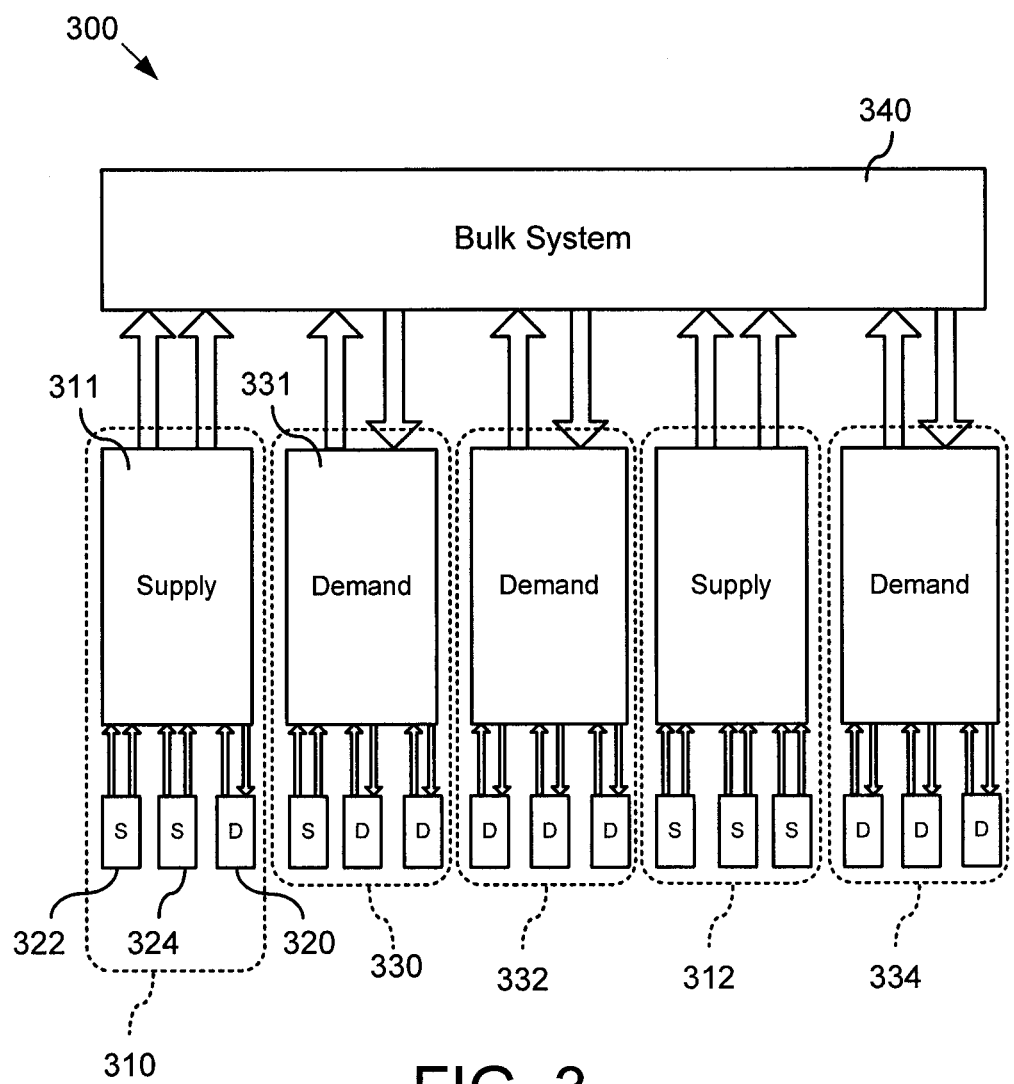
FIG. 3 is a schematic block diagram of a nested, hierarchical resource allocation scheme according to an embodiment of the disclosed technology.

FIG. 3 is a schematic block diagram illustrating an embodiment of a nested, hierarchical resource allocation system 300 according to the disclosed technology. In the embodiment shown in FIG. 3, system 300 comprises multiple nested resource allocation systems, which themselves comprise self-similar resource allocation subsystems. The resource allocation system 300 can be nested to any arbitrary depth, with net producers (such as net producer 311) making supply offers and net consumers (such as net consumer 331) making demand requests to a larger bulk system 340. All resources that are limited in some manner and can be measured can be allocated independently in such a system. The embodiments disclosed herein generally concern applying the resource allocation system 300 to an electrical power grid in which electrical power is limited, but it is to be understood that this application is not limiting. The resource allocation system can be used in other contexts as well, including water supply, Internet-bandwidth distribution, or other such markets having limited resources.

In the illustrated embodiment, each of the resource allocation systems operates by periodically collecting demand requests from consumers and supply offers from resource suppliers and determining an index value (e.g., a price) at which the resource allocation is to be dispatched. This "index value" is sometimes referred to herein as the "valuation index." As more fully explained below, the dispatched index value (e.g., the settled price) is determined from index values associated with the demand requests and supply offers. In one particular embodiment, the process is different than traditional markets in that an index that is capable of being monetized (rather than just a currency value itself) is used. The index provides a common valuation method for participants in the system. The index may itself be a currency, but in the absence of a single currency, a separate market can be operated to trade units of the index. For instance, one such index unit might be units of $CO_2$. Thus, in this example, instead of trading resources using money, participants can have resources allocated using indexes having units of $CO_2$. Participants can then use a separate traditional market to monetize the units of $CO_2$. Other index units are also possible, including index units that are unique to the resource allocation system but that are capable of being monetized. For ease of presentation, reference will sometimes be made in this disclosure to the index for a resource as though it were the actual price of the resource. It is to be understood that such reference includes not only the situation where the index is the currency, but also the situation where the index is another index unit that is capable of being monetized or traded.

B. Participants and Accounts

In one embodiment of the disclosed technology, at least some of the participants in the system have accounts in which the fund of index units at their disposal is kept. As consumers use resources, their index fund balances are debited, and as producers deliver resources, their index fund balances are credited. Index funds can be credited using a variety of mechanisms, including up-front deposits (e.g., through incentives), periodic deposits (e.g., with income), or purchased funds from a separate index fund market when producers sell funds.

C. Supply Offers and Demand Requests

In one exemplary embodiment of the disclosed technology, electrical consumers use computing devices to request resources from their local transmission node based on their current needs (e.g., the needs of the appliances or electrical devices in the consumer's residence). For example, consumers can input their resource requests through a web site that transmits the user's requests over the Internet to the local transmission node computing device that allocates the resource. In such instances, the requests can be computed and transmitted by executing computer-executable instructions stored in non-transient computer-readable media (e.g., memory or storage). Alternatively, a consumer's appliances or electrical devices can be configured to themselves compute the resource requests (in which case the appliance or device can be considered as the consumer). In such instances, the requests can be computed using computing equipment embedded in the appliances or electrical devices themselves. In still another alternative, computing equipment at the consumer's residence can collect information from one or more of the consumer's appliances or electrical devices and transmit aggregated requests to the local transmission node.

The computing equipment can comprise a computer system (e.g., a processor and non-transient computer-readable media storing computer-executable instructions) or can comprise a specialized integrated circuit configured to compute the resource request or offer (e.g., an ASIC or programmable logic device). If the requests are computed by the appliances or electrical devices themselves, the requests can be directly sent to the local nodal market (e.g., via the Internet) or can be aggregated with other requests (e.g., using a computer or other computing equipment at the consumer's home). For instance, the appliances and electrical devices at the consumer's home can transmit their requests (e.g., wirelessly using Wi-Fi or the like) to a local computer or a computer-based home energy management system ("HEMS"), which aggregates the requests. The aggregated requests can then be sent together to the distribution service provider (e.g., as a single request to the computing device operating the local nodal market or as a single message comprises a string of requests).

In one exemplary embodiment, resource requests comprise two pieces of information: the quantity of the resource desired (described, for example, as a rate of consumption for the time frame over which the resource will be allocated) and the requested index value. In some embodiments, the requested index value is the maximum index value at which the quantity will be consumed. Desirably, consumers submit at least one such request for each time frame in which they wish to consume, and the time frame is determined by the local transmission node. The time frame can vary from embodiment to embodiment, but in some embodiments is 60 minutes or less, 15 minutes or less, or 5 minutes or less, and some embodiments can use mixed time and/or overlapping frames.

As more fully explained below, the time frame can depend on the size of the nested, hierarchical resource allocation system and the number of nested resource allocation systems within the overall system. In general, the time frame used in a lower-level system in a nested framework will be less than the time frame for a higher-level system in the nested framework. After receiving such requests within the time frame, the local transmission node can compute and dispatch the index value at which each resource is allocated. This value is sometimes referred to herein as the "dispatched index value," or "dispatched value." In applications where the value is the actual price, this value is referred to as the "settled price" or "real-time balance price."

In one exemplary embodiment, resource suppliers use computing devices to submit offers for resources to a local transmission node based on the current cost of providing the resources. Resource suppliers can include, for example, utility substations at the same or higher transmission level (e.g., transmission substations, substransmission substations, or distribution substations), merchant generators (e.g., large-scale power generators using coal-, nuclear-, wind-, solar-, hydro-, or geothermal-based power generation), local generators (e.g., diesel generators or smaller scale solar or wind generators), or consumer-based generators (e.g., electric vehicles). For example, the supply offers can be computed and submitted over the Internet using a computer system (e.g., using a dedicated web site). Alternatively, the supply offer can be computed and transmitted using a specialized integrated circuit configured to compute the resource offer (e.g., an ASIC or programmable logic device). Any such computing hardware can be coupled directly to and provide control over the relevant equipment for supplying the resource. For instance, the computing hardware can be integrated with the control equipment for an electrical power generator, thereby allowing the computing hardware to directly activate and deactivate the generator as needed.

In one exemplary embodiment, offers comprise at least two pieces of information: the quantity of resources available (described, for example, as a rate of production for the time frame over which the resource will allocated) and the requested index value for the quantity of resource. In some embodiments, the requested index value is the minimum index value at which the resource will be produced. Producers desirably submit at least one such offer for each time frame in which they wish to produce resources, and the time frame is determined by the service provider.

In one exemplary embodiment for operating the resource allocation system, consumers are required to consume the resources which they requested only if they requested the resource at an index value greater than or equal to the dispatched index value. Conversely, consumers are prohibited from consuming the resources if they requested the resource at an index value less than the dispatched index value for that time frame. These rules can be enforced, for example, at the appliance or electrical device level (e.g., using appropriate shut-off hardware) or enforced by control signals sent from a computer at the consumer's home or locale to the relevant appliance or equipment. Violation of these rules can be subject to a penalty (e.g., a penalty levied against the offender's index fund account). Furthermore, in some embodiments of the disclosed technology, consumers can submit unconditional requests that require the distribution service provider to deliver the resource at any price, and require the consumer to accept it at any price.

Similarly, in one exemplary embodiment for operating the resource allocation system, producers are required to produce the resources which they offered only if they offered the resource at an index value less than or equal to the dispatched index value. Conversely, producers are prohibited from producing resource if they offered the resource at an index value greater than the dispatched index value for that time frame. Violation of the rules can be subject to a penalty levied against their index fund accounts. Furthermore, in some embodiments of the disclosed technology, producers can submit unconditional offers that require the distribution service provider to accept the resource at any price, and require the producer to supply it at any price.

D. Aggregation Services

Figure 4A:
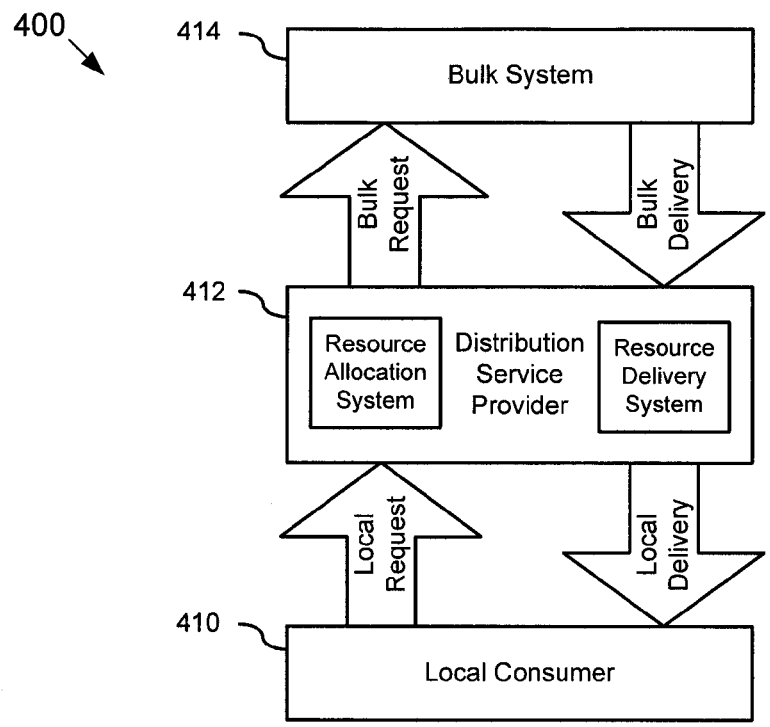
FIGS. 4A and 4B are schematic block diagrams of features of a nested, hierarchical resource allocation scheme, such as the scheme of FIG. 3.
Figure 4B:
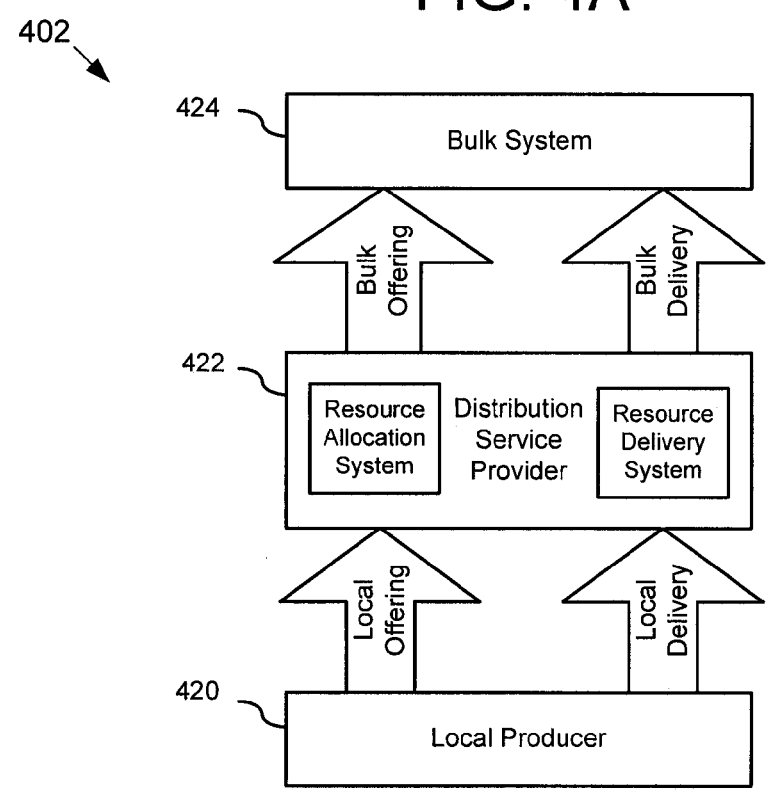

In certain embodiments of the disclosed technology, and as noted above, a service provider may in turn be a consumer or producer with respect to another service provider, depending on whether they are a net importer or exporter of resources. Examples of such arrangements are shown in block diagrams 400 and 402 of FIGS. 4A of 4B. In particular, FIG. 4A shows a local resource consumer 410 that makes demands on a local transmission node (e.g., the local feeder) 412, which in turn aggregates local requests to make an aggregated bulk request on a next-higher nodal level. In the illustrated embodiment, the next-higher nodal level is bulk distribution service provider 414, but can be a transmission node associated with a subtransmission substation, transmission substation, or other higher-order node in the electrical grid. FIG. 4B shows a local producer 420 that makes offers to a local transmission node (e.g., the local feeder) 422, which in turn aggregates local offers to make an aggregated offer on a next-higher nodal level. In the illustrated embodiment, the next-higher nodal level is bulk distribution provider 424. Any number of service providers can be combined to construct a system of arbitrary size and complexity.

In certain embodiments of the disclosed technology, producers and consumers can make non-firm offers and requests as well, but such requests can have an index premium with respect to the firm offers and requests presented during a given time frame. The premium can be based, for example, on the difference between the aggregate cost of load following in the service providers system and the cost the same in the bulk system (load following service cost arbitrage).

E. Multiple Time Frames

As resources are aggregated to larger and larger system, the time frame over which allocation is performed can be lengthened. For example, the lowest-level resources (e.g., feeder-level resources) might be dispatched on a 5-minute basis, mid-level resources (e.g., transmission-substation-level resources) might be dispatched on a 15-minute time frame, and highest-level resources (e.g., bulk-grid-level resources) might be dispatched on a 1-hour time frame. This permits aggregators to also aggregate over time by exchanging or moving blocks of resources against across time frames using storage capacities and ramp rates.

Both consumers and producers can break their total demand and supply into multiple requests and offers spanning multiple time frames. For example, in the face of 10% uncertainty (or other percentage of uncertainty) in the quantity needed, a consumer can request the mean quantity of the needed resources in a longer time frame at any price and exchange (buy or sell) the remaining 10% fluctuation (or other percentage of fluctuation) in a shorter time frame at any price.

Additionally, in certain embodiments, bids can be submitted to the higher-level markets for resources that are to be supplied during one or more future time frames that are not imminent (e.g., time frames that occur during the following day, following two days, following week, or any such future time frame). Such bids for future time windows can be in addition to the bid for the next time interval and can be used to help secure power and settle the bulk-resource market in advance of the actual power needs. In some implementations, such bids for future time windows indicate a future energy need (kWh) rather than an imminent current power need (kW).

F. Exemplary Techniques for Determining a Dispatched Index Values

In each time frame, the dispatched index value (e.g., the settled price or real-time balance price) and quantity allocated is determined by the resource allocation service for the local transmission node. A wide variety of methods can be used to determine the dispatched index value. In certain embodiments, however, the dispatched index is determined using a double auction technique. For instance, in one particular embodiment, the following technique is used. The requests and offers are separated into two groups. Each is sorted by the index value provided, requests being sorted by descending value, and offers by ascending value (or vice versa). Next, each item in the sorted lists is given a quantity level computed by adding its quantity to the previous item's quantity level, with the first items quantity level being its quantity alone. Finally, the dispatched index value is found by determining the index value at which the same quantity level for requests and offers occurs. In one embodiment, this can occur in one of two ways. Either two requests bound a single offer, in which case the supplier is required to supply less than the offered quantity and the offer index is the dispatched index; or two offers bound a single request, in which case the consumer is required to consume less than the requested quantity with only partial resources and the request index value is the dispatched index. Additionally, there are some special cases that although rare must be handled explicitly. Whenever both consumers and suppliers mutually bound each other at a given quantity level, the dispatched index can be the mean of the offer and request indexes, the request index, or the offer index. In certain embodiments, the method that maximizes the total benefit (e.g., profit) to both consumers and producers is chosen and in cases where more than one index level maximizes the total benefit, the index level which most equitably divides the total benefit between consumers and producers is chosen.

Figure 7:
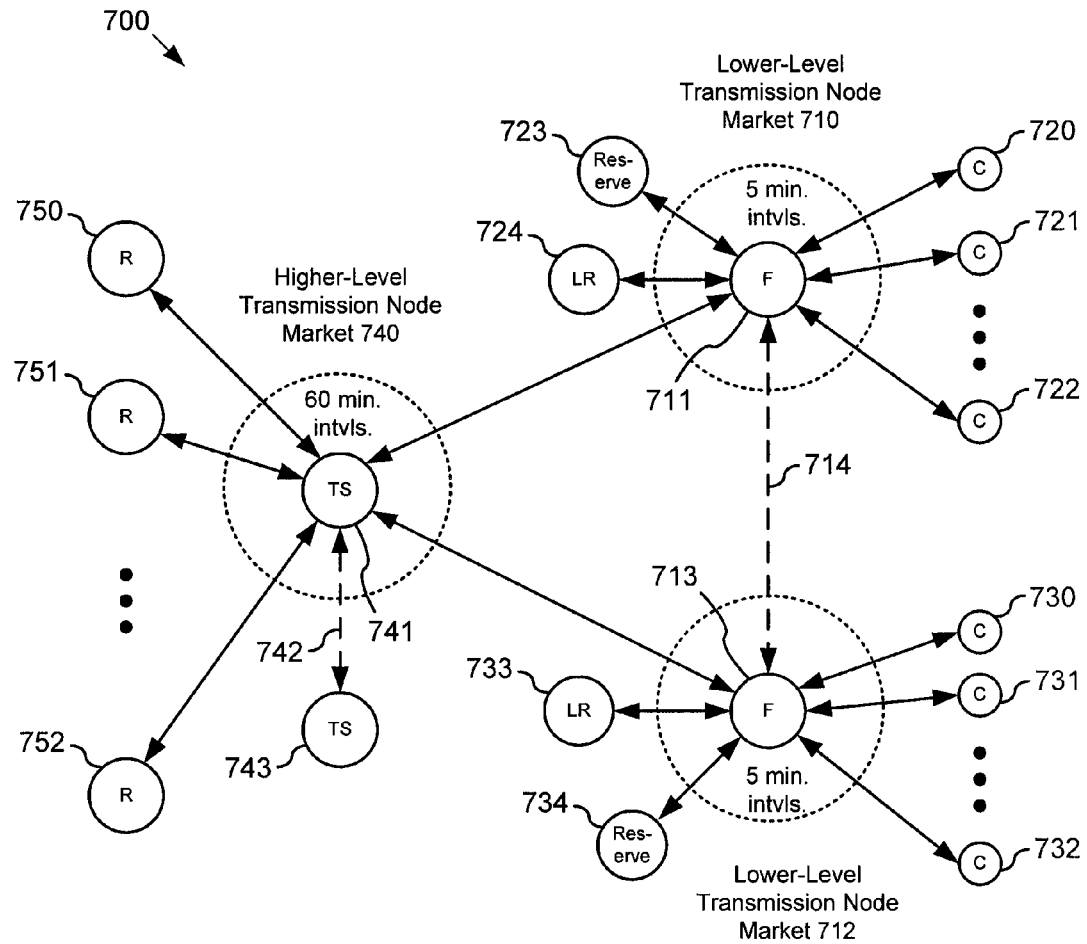
FIG. 7 is a schematic block diagram of nodal transmission markets as can be implemented according to embodiments of the disclosed technology.

In other embodiments, however, the dispatched index is determined using an iterative method (e.g., the method of FIG. 7, a Gauss-Seidel method, or a location marginal price method). An iterative approach is desirably used in embodiments in which multiple transmission nodes are allowed to submit and/or receive bids and/or offers from each other. In other words, an iterative approach can be used when the transmission network is a meshed network, and not strictly a radial network. (As more fully described below, one such meshed network where it is desirable to use an iterative method is at the bulk-resource-generation level in the electric grid.)

Figure 5:
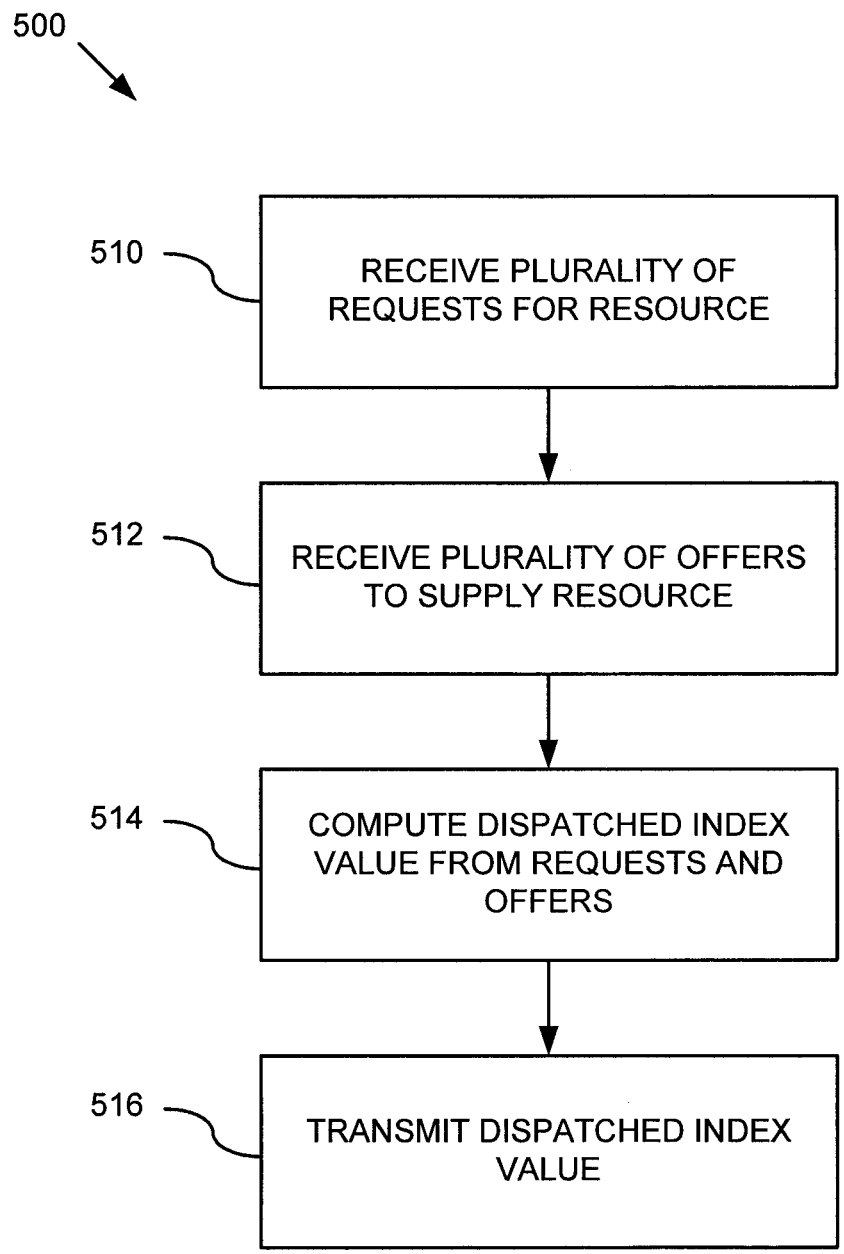
FIG. 5 is a flowchart for a first exemplary method of determining a settlement price according to embodiments of the disclosed technology.

FIG. 5 is a flowchart 500 showing a generalized method for settling offers and requests as can be used in any of the disclosed resource allocation systems. The particular method shown in FIG. 5 is for a system for allocating electricity resources, but this usage should not be construed as limiting. The method can be performed using computing hardware (e.g., a computer processor or an integrated circuit). For instance, the method can be performed by computing hardware that manages the resource market at a transmission node.

At 510, a plurality of requests for electrical power are received from a plurality of electrical-power users (e.g., electrical devices, home consumers, or other transmission nodes). The requests can comprise data messages indicating a requested quantity of electrical power and a consumer-requested index value (e.g., the maximum price a respective electrical-power user will pay for the requested quantity of electrical power).

At 512, a plurality of offers for supplying electrical power are received from a plurality of electrical-power suppliers (e.g., local generators, merchant generators, or other transmission nodes). The offers can comprise data messages indicating an offered quantity of electrical power and a supplier-requested index value (e.g., the minimum price for which a respective supplier will produce the offered quantity of electrical power).

At 514, a dispatched index value is computed at which electrical power is to be supplied based at least in part on the consumer-requested index values and the supplier-requested index values. In some implementations, the act of determining the dispatched index value is performed using a double auction method. For example, the act of determining the dispatched index value can comprise separating the requests and the offers into two groups, sorting each item in the two groups according to a quantity level, and determining the dispatched index value by determining the index value at which the same quantity level for requests and offers occurs. In other implementations, the act of determining the dispatched index value is performed using an iterative-solution method (e.g., the method of FIG. 6, a Gauss-Seidel method, or a locational marginal price method). Such a method can be performed, for example, when transmission nodes at the same nodal level are allowed to submit and/or receive bids and/or offers from one another.

At 516, the dispatched index value is transmitted to at least one of the end-use consumers or resource suppliers (e.g., using suitable communication means, such as the Internet or other network).

Methods acts 510, 512, 514, and 516 can be repeated at periodic intervals (e.g., intervals of less than 60 minutes, less than 10 minutes, about 5 minutes, or other such intervals). Furthermore, it should be understood that the method acts 510 and 512 do not necessarily occur in the illustrated sequence. Instead, the orders and requests can be received substantially simultaneously. For instance, the orders and requests can be received at various times and/or orders within a given time period and before the dispatched index is determined.

G. An Exemplary Electrical System Configuration Using Embodiments of the Disclosed Technology Returning to FIG. 3, FIG. 3 illustrates an electrical system configuration 300 according to embodiments of the disclosed technology. In the electrical system configuration 300, a valuation index is used as currency and the commodity is electric power at specified levels of service. The electrical system configuration 300 provides a system in which commodities are evaluated and transmitted. In such a bulk system, such as a transmission grid, the system typically operates according to one or more of the following overall objectives: (1) maintain a moment-by-moment balance of purchased supply and sold demand at the least possible cost over a large, interconnected region of the power grid; (2) disallow arrangements of electricity supply being injected into the grid at various points in the transmission system when, even though they achieve lower production cost, they would overload transmission lines, cause electrical instability, or not maintain proper safety margins; (3) provide for extra resources to (a) be held in standby as reserves to manage unforeseen contingencies and (b) provide for resources that can rapidly ramp up and down to provide final adjustments to regulate the supply/demand balance; (4) maintain service to the extent possible during contingencies; and/or (5) restore service as soon as possible after an outage. In the illustrated example, the supply in the second tier of FIG. 3 can be provided by an (integrated) utility with generation of its own (such as integrated utility 310) or a merchant generator (such as merchant generator 312).

A typical merchant plant (such as merchant generator 312) has no demand to serve or balance. Its objective is typically to produce and sell more or less power to the bulk system and to sell reserves and regulation services to the bulk system from its power plants and loads in a way that optimizes the positive difference between the sale price and its production cost over the course of the year, accounting for one or more of the following: (1) the relative cost of fuel and variable and fixed O&M costs; (2) the fuel conversion efficiency of its plants, which varies with its output and other conditions; (3) engineering constraints on maximum and minimum output and ramping rates within that range; and/or (4) current and forecasted output over time of renewable bulk power generating resources, like wind farms or central solar plants.

A typical integrated utility (such as integrated utility 310) has the demand of its own substations to serve (such as substation 320, designated by the small "D" box beneath the integrated utility, which may be a transmission substation, substransmission substation, distribution substation, individual feeder, or other such transmission node) and must supply it with some combination of its own generation from its local generators (such as generators 322, 324 designated by the small "S" boxes beneath the integrated utility) and/or power from the bulk system. An integrated utility typically operates according to one or more of the following objectives: (1) maintain a balance of supply and demand at the lowest possible cost, which must be recovered through customer rates by varying the power output of its plants, buying or selling power to the bulk system, and influencing its demand to go up or down selling reserves and regulation services to it from its power plants and loads; (2) realize its own financial incentives; and/or (3) keep rates (prices) as low as possible for its consumers accounting for, for example, (a) the relative cost of fuel and variable and fixed O&M costs; (b) the fuel conversion efficiency of its plants, which varies with its output and other conditions; (c) engineering constraints on maximum and minimum output and ramping rates within that range; (d) current and forecasted output over time of renewable bulk power generating resources, like wind farms or central solar plants; and/or (e) incentives or changes in price presented to consumers to modify their normal demand.

The example shown in FIG. 3 also shows distribution utilities (or load serving entities) with and without distributed generation resources. For example, distribution utility 330 includes a distributed generation resource, whereas distribution utilities 332, 334 do not include any distributed generation resources. A distribution utility typically operates according to one or more of the following objectives: (1) maintain a balance of supply and demand for its customers by purchasing power from the bulk grid sufficient to meet the aggregated demand of its substations and influencing its demand (net of local generation) to go up or down selling reserves and regulation services from its loads and local, distributed generation and storage resources (often customer-owned); (2) realize its own financial incentives; (3) keep rates (prices) as low as possible for its consumers accounting for, for example, (a) the cost of purchased power from the bulk grid; (b) the cost of purchased power from distributed generation and storage units; (c) the current and forecasted output over time of local, renewable power generating resources like wind turbines or photovoltaic solar systems; and (d) incentives or changes in price presented to consumers to modify their normal demand; and/or (4) deliver power to meet the net demand of its customers without overloading any of its sub-transmission lines, substation transformers, distribution circuits, or customer transformers, maintain service to the extent possible during contingencies, restore service as soon as possible after an outage.

Not shown in FIG. 3 are the individual residential, commercial, and industrial electricity customers that are typically served by feeder networks (e.g., a feeder network comprising one or more feeders that have common constraints and that are controlled by a common distribution substation) and that embody the end-use appliances, equipment, systems and processes that require electricity for various purposes with varying schedules, response to weather, level of need, economic productivity, flexibility to be adjusted, and willingness to pay for electric service. The objectives of the typical customer are to: (1) satisfy needs for comfort, service, and productivity from electricity consuming devices; and (2) minimize the cost of service.

1. Bulk Grid Resource Allocation

In certain embodiments of the disclosed technology, at the bulk-transmission-grid level, the balance of supply and demand is maintained by a market in which supply is matched to demand through an auction process. Two such processes are described below: locational marginal pricing and a nodal market scheme. Both schemes are valid for resource allocation for the bulk power grid, which is typically a meshed network at the bulk-resource level. Both schemes assume there may be financial penalties or premiums that are levied for not complying with the commitments to generate or consume power as scheduled, which if allowed to become large or frequent, would disrupt the value of the allocation scheme. Premiums presumably would be set by a secondary market for imbalance power.

(a) Locational Marginal Price

The first scheme, known as locational marginal pricing, typically involves two steps. First, a trial auction is held in which, for a given time period (typically an hour), offers to generate power (price and quantity) from utilities and merchants are ordered from lowest to highest to develop a supply curve. Similarly, asks to buy power (price and quantity) to serve demand from utilities are sorted from highest to lowest to form a demand curve. The price and quantity at which the supply and demand curve intersect determines the unconstrained market price and the amount of power that could be generated and delivered by the bulk system if power could be moved from any generator to any load service point (e.g., substation).

The second step involves computing the power flows that would occur from dispatching the unconstrained market closing supply offers and demand asks, and using engineering computations to check that the transmission grid throughput constraints discussed in the previous section are not violated. Because this is a highly complex calculation that must be executed in time to close the market and operate the grid, many simplifications are typically made to speed the calculation. These simplifications typically involve lumping generators and load serving points that, while physically distinct, are in close enough proximity to be approximately considered as a single locational marginal pricing node in the system.

If any violations are identified, then an iterative process is used to search for the lowest cost set of supply offers (and, in principle, demand asks) that can satisfy the constraints. In order to accept some supply offers that are, by definition, higher than the unconstrained market costs, the market is effectively localized by sufficiently raising the price at the affected nodes to cover the highest supply asks at that node required to operate the system at the lowest cost. The market closing locational marginal price (and quantity) at each node is the unconstrained closing price (and quantity) if no adjustments have been made, or the constrained closing price for that node if adjustments have been made. Thus, prices are now differentiated by location sufficiently to balance supply and demand with consideration of physical constraints of the transmission grid.

In the following section, an alternative bulk grid resource allocation scheme that follows the general schema illustrated in FIG. 3 is disclosed and that has a number of additional features.

(b) Nodal Transmission Markets

In certain embodiments of the disclosed technology, the bulk market's locational marginal price process is replaced by a set of individual, parallel nodal transmission markets. In these embodiments, a separate market to balance supply offers and demand asks is established at a plurality of transmission nodes. Unlike the locational marginal price scheme, and in particular embodiments, the transmission nodes can be located at the intersection of each transmission line with each other (e.g., at the transmission substations), the intersection of a transmission line with a generator, the intersection of a transmission line with a feeder network (e.g., at the distribution substations), or (more generally) the intersection of a transmission line with any load serving point. At the bulk-transmission-grid level, the participating nodal transmission markets may only be a subset of all the transmission nodes in a nested, hierarchical resource allocation system. For example, the transmission nodes participating at this level may only be higher-level nodes (e.g., transmission substations that have markets operating at longer time frames than the lower-order nodes, such as at the distribution substation level).

Thus, in contrast to the locational marginal price scheme, the transmission nodes represent the physical configuration of the power grid without the lumping required to implement the locational marginal price scheme in practice. In some embodiments of the nodal transmission market, two or more of the transmission nodes are allowed to trade with adjacent (or otherwise interconnected) transmission nodes to buy and/or sell power. Since, to a first order, the physical constraints of the lines connecting each node are known, the limits to trading are set at those constraints and integrated into the market operated at a respective individual transmission node.

In particular embodiments, one or more of the nodes (e.g., each node) constructs an integrated injection-withdrawal curve that combines its supply and demand curves into a single curve defining the amount (balance) of power it will inject into the system (e.g., positive) or withdraw (e.g., negative) at any given price, based on its local supply and demand offers and asks. The node then supplies this curve as a bid to each of its neighbors with which it can trade, individually offering to sell power to them (in the amount of its positive balance) or buy power from them (in the amount of its negative balance) at its current local price. Offers to buy and sell are constrained by the maximum throughput on the transmission lines to each neighbor.

Analogous to this process and in parallel with it, each node with generation offers to generate a given amount of reactive power at a separate price.

The settlement process can be an iterative one in which the prices at each node are adjusted until balance is achieved. For example, and according to one particular embodiment of the disclosed technology, each node determines the prices at which the net real and reactive power are zero (imports−exports+injection−withdrawal). To implement this process, bids from neighboring nodes are collected. After the bids are received, a trial close of each node's markets determines the proposed injection-withdrawal at each node, and a physical load flow calculation is performed to compute actual power flows in the transmission network. Certain iterative solution methods (e.g., a Gauss-Seidel iteration process) are well-suited to this mode of calculation because they do not require balanced flows at each iteration. The resulting net imbalance of flow between the nodes is reported to each node. The net imbalance of flow is then used by a node to adjust its injection-withdrawal bid. The revised injection-withdrawal bid is then transmitted again to each neighboring node, and the process of performing a trial close, computing a physical load flow, and reporting any imbalances to each node is then repeated.

If imbalances in real and reactive power at each node remain (e.g., imbalances that deviate from zero above or below an acceptable tolerance), then a further iteration is performed. When the imbalance in real and reactive power at each node becomes zero within some acceptable tolerance (which can be predetermined or user-selected), the markets are settled for the time interval. In certain implementations, if any nodal market fails to settle at a single price for some reason, then its neighbors are informed of the failure and the net power mismatch. The neighboring nodes can then rebid in order to reduce the mismatch. In general, each bidder will be configured to bid a fractionally higher or lower price and/or quantity such that their relative contribution to the mismatch tends to be eliminated. This process can be asynchronous or synchronous. When the net power imbalance of zero (within the acceptable tolerance) is reached, the prices are announced to the neighbors and they become prices at that node. Hence the prices completely determine the imports, exports, generation and demand.

Certain embodiments of the nodal transmission market method rely on two features to make this iterative process possible. The first is the use of improved computing resources (such as multi-processor computers with parallel computing capability). The second is the adaption of the Gauss-Seidel algorithms to run efficiently on these computers.

While the nodal transmission market scheme may produce similar results to an locational marginal price scheme, it has the advantage of distributing the operational aspects of the schema rather than centralizing it. Consequently, embodiments of the nodal transmission market scheme can offer increased robustness to attack, disruption, or the need to operate with unusual topological configurations in unforeseen contingencies. Furthermore, embodiments of the nodal transmission market scheme can offer easier computation because first order constraints can be inherently included. Hence, better spatial resolution of nodes is possible with attendant increases in the equity and fidelity of the price signals it provides to suppliers and consumers. Further, embodiments of the nodal transmission market scheme can afford the possibility of a simple mechanism for allocating and collecting "rent" in proportion to the use of each line as part of the transaction costs, to help pay for transmission system upgrades, either in a market-based transmission construction scheme or in a regulated utility-oriented scheme. Additionally, and most desirably, embodiments of the nodal transmission market scheme incorporate demand and its response to price signals into the scheme on an equal basis with supply.

Figure 6:
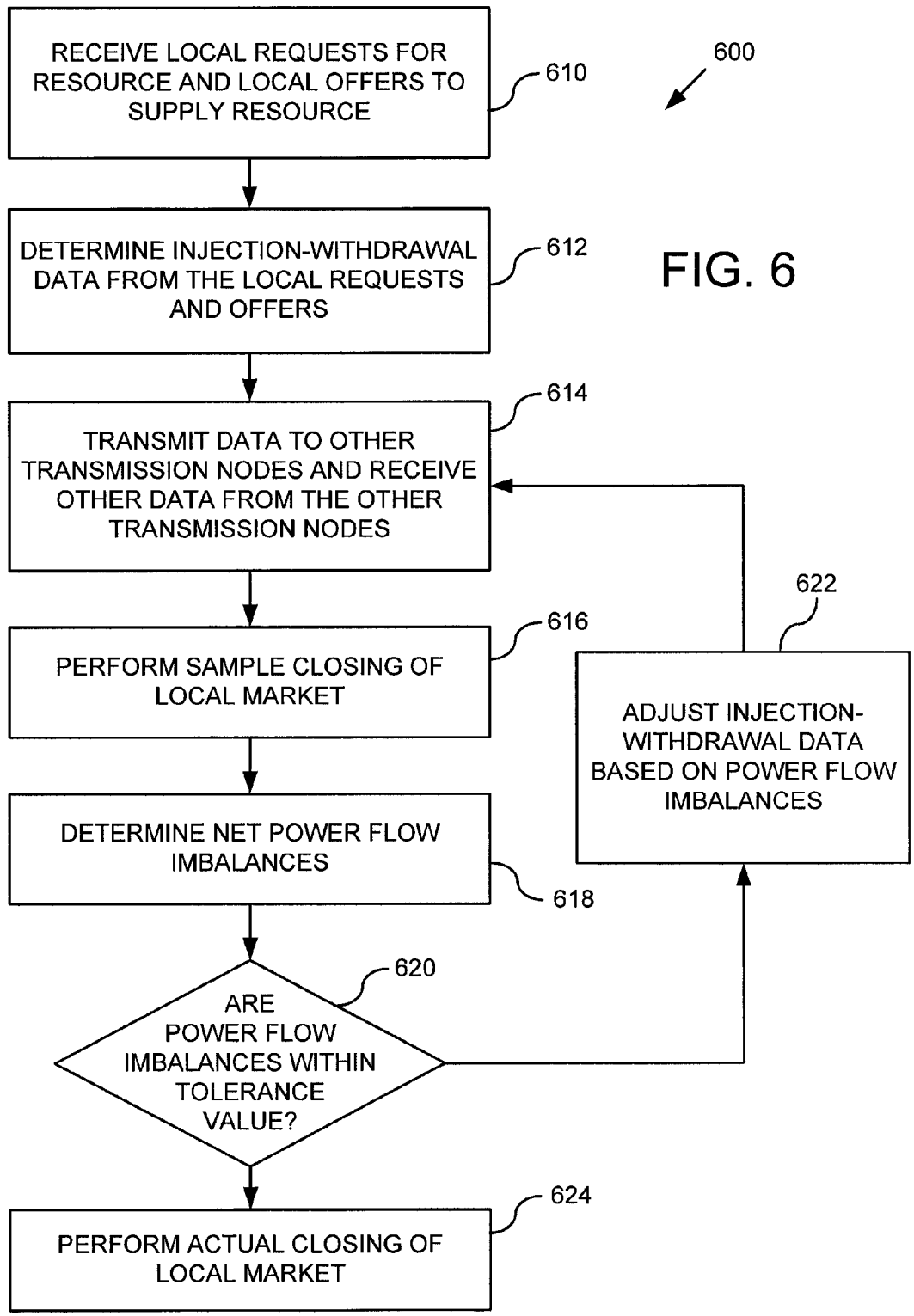
FIG. 6 is a flowchart for a second exemplary method of determining a settlement price according to embodiments of the disclosed technology.

FIG. 6 is a flowchart 600 showing a generalized method for settling offers and requests using an iterative process as can be used in any of the disclosed resource allocation systems. The particular method shown in FIG. 6 is for a system for allocating electricity resources, but this usage should not be construed as limiting. The method can be performed using computing hardware (e.g., a computer processor or an integrated circuit). For instance, the method can be performed by computing hardware that manages the resource market for a local transmission node. Furthermore, the method can be performed for each of the real and reactive power of a node.

At 610, a plurality of local requests for electricity and a plurality of local offers for supplying electricity are received. The requests and offers are "local" in the sense that they are received from direct users and suppliers of power rather than from transmission nodes on the same nodal level that are also submitting bids or offers. The requests and offers can comprise data messages as explained above with respect to FIG. 5.

At 612, data (e.g., a single curve) is constructed that defines the amount (balance) of power the transmission node can inject into the transmission system (e.g., a positive value) or withdraw (e.g., a negative value) at a plurality of different prices (e.g., any given price). In other words, the data indicates the amount of excess power available or extra power needed at the transmission node as a function of price. In the illustrated embodiment, this data is referred to as the injection-withdraw curve. It should be noted that this information can take a variety of different data forms and need not strictly identify a curve.

At 614, the data is transmitted to other transmission nodes that are interconnected with the local transmission node. Similar data (other injection-withdrawal curves) from the other transmission nodes are also received.

At 616, a sample closing of the market is performed. For instance, the sample closing of the market can be locally performed. The initial price selected can be, for example, the price at which the local market would have closed using just the local requests and offer (e.g., using a double-auction technique). Alternatively, data from the other transmission nodes can be factored in (e.g., the highest bids and lowest offers from the other transmission nodes can be factored in to the closing price). After closing, proposed injections and/or withdrawals are known at the transmission node.

At 618, net power flow imbalances are determined for the local transmission node. For example, the proposed injections and withdraws from the other transmission nodes can be transmitted to one another (or computed centrally). The proposed injections and withdraws from all the nodes can be used, for example, to perform a physical load flow calculation that computes actual power flow in the network. When the proposed injections and withdraws do not match one another, a resulting net imbalance exists between the relevant nodes.

At 620, the net power flow imbalances of the local transmission node are evaluated to determine whether they are zero or within an acceptable tolerance value of zero (e.g., a predetermined or user-selected tolerance value).

If the net power flow imbalances are not within the acceptable tolerance, then the injection-withdrawal data (e.g., the injection-withdrawal curve) is adjusted at 622.

The data can be adjusted incrementally in a direction calculated to reduce the net imbalances at the node. The adjusted data (e.g., the adjusted injection-withdrawal curve) can then be transmitted to the other transmission nodes and acts 614, 616, 618 can be iteratively repeated.

If the net power flow imbalances are within the acceptable tolerance, then the local market can be closed at 624 using the price determined during the successful sample closing. In certain implementations, the nodal transmission markets can close at different times, although in other embodiments the nodal transmission markets are controlled so that they close substantially simultaneously.

The procedure 600 can be repeated at periodic intervals (e.g., intervals of less than 60 minutes, less than 10 minutes, about 5 minutes, or other such intervals). Accordingly, in certain embodiments, the tolerance value may be relaxed or other measure taken to ensure that the markets close if the net power flow imbalances do not converge at a suitably fast rate. Furthermore, the iterative process can be adapted to be a Gauss-Seidel or modified Gauss-Seidel iterative process.

2. Distribution Resource Allocation

At the distribution level, a distribution utility delivers power to its customers, including the effects of demand, local distributed generation, and local distributed storage, which all may respond to price. The power the distribution utility delivers has both real and reactive components, and certain devices (e.g., some types of generation and storage devices) can inject (and, in the case of storage, withdraw) real and/or reactive power. This can offset the power that must be generated or purchased from the bulk transmission grid level.

The closure of the transmission markets (e.g., the transmission markets at the bulk-resource level as described in the previous section) provides a localized nodal price for a load service point, and the distribution resource allocation scheme can start with this as its base price. (Note that this price may need to be adjusted, as appropriate, to account for the difference in scale between the time frames at which transmission market operates and the time frames at which the distribution resource allocation market operates. For example, the distribution resource allocation market may operate at 15 minute intervals, whereas the transmission market may operate at 1 hour intervals.) The distribution resource allocation scheme can then operate markets for real and reactive power at a plurality of constrained points in its service territory (e.g., in some embodiments, the transmission nodes at the distribution resource allocation level are distribution substations). The market can be operated in an analogous manner as the bulk transmission market. For example, the dispatch index (or settling price) for the nodal transmission markets at this level can be determined using any of the embodiments described herein. For example, in embodiments in which the transmission nodes are allowed to submit bids and/or receive offers from one another (e.g., a mesh network), an iterative settling process can be used (e.g., the method of FIG. 6). In these embodiments, the power flow calculations are generally simpler than at the bulk-resource level. In embodiments in which the transmission nodes are not allowed to submit bids and/or receive offers from one another (e.g., a radial network), a non-iterative settling process can be used (e.g., the method of FIG. 5 alone). Most distribution systems are designed and operated for radial flow of power. In other words, there is a single path from supply to each customer. As noted, the physical calculations in such systems are typically much simpler.

If there are operational constraints below the substation, at a feeder for example, then a lower-level distribution market can be operated for that constrained point, buying and selling resources from the substation that serves it, and so on. For example, the system described in Section III is a resource allocation system that operates at the feeder level; that is, the nodal transmission market for the system described in Section III is for an individual feeder.

Distribution markets (and other lower-level markets) typically operate at a finer time scale (e.g., 5-15 minutes) than the bulk market, so the bulk market nodal price can be considered as a fixed boundary condition for the period of the bulk market cycle (e.g., ~1 hour). The local bids in the distribution market can be used to assemble a reasonably accurate bid (in aggregate) for the next time period in the bulk market. As for the bulk market, there may be financial penalties or premiums that are levied for not complying with commitments to supply or consume power as bid, with premiums presumably set by a secondary market for local imbalance power.

In certain embodiments, the distribution market typically operates according to one or more of the following objectives: (1) maintain the net demand of its customers to the contracted amount of the ask bid into the bulk transmission node market; (2) aggregate and represent the bids for demand, local generation, and storage for the customers it serves and represent them to the bulk transmission node market; (3) when there is a constraint that would otherwise be violated, auction off the available capacity to customers and other resources, using supply offers from local generation and storage downstream of the constraint, and asks for power for controllable demand and storage, and uncontrolled supply from renewables and demand from non-controlled loads; and/or (4) do this in a way that optimizes costs in terms of avoiding penalties and premiums for not meeting commitments to the bulk market and avoiding damaging distribution equipment while deferring the need to upgrade that equipment as long as cost effectively possible.

For example, the distribution substation can purchase power from the bulk power nodal market discussed above and add on a local price adjustment, raising and lowering the price to lower and raise net demand, respectively. Further downstream constraints can be assigned to markets on an as-needed basis to manage them. Such lower-level markets also aggregate the customers and distributed resources below and represent them to the distribution market above.

This exemplary distribution resource allocation scheme serves the need for the power grid to effectively allocate demand response, local distributed generation and storage, and renewable resources locally to meet loads and system constraints, and to represent them to the bulk market globally.

3. Customer Resource Allocation

The customer desirably has a system to automatically and continually respond to prices on their local nodal transmission market with adjustments to optimize the service provided by the electricity consuming devices at the customer's premise, minimize the customer's electricity bill, and pass decision current prices down to specific end-use control systems for them to respond, and acquire from them their need for power for the next few minutes. These tasks are desirably performed while maintaining the privacy of the consumer. So, one service a customer resource allocation system (such as a Home Energy Management System ("HEMS")) desirably provides is to aggregate all the loads at the premise, including a best estimate of the load from devices that are non-controllable either by function or by choice, and their response to price. The system then presents this aggregate load response price to the local nodal transmission market (e.g., the distribution market above) so that the market can close. The settled price can then be sent to the consumer, who is then contractually obligated to consume the contracted amount of electricity at the settled price for the next time period, with penalties or premiums for non-compliance outside certain limits that may be shared or traded with other customers within the distribution market, bilaterally or managed by the market itself.

This can set up a "market" within a customer premise for power, in which the premise or meter contracts for power with the distribution system that serves it, and then manages the controllable end-use devices to maintain that commitment. End-use devices of various sorts can, in turn, have controls that modify demand in response to current price. Some examples of these are described in the following section. By extension, this same approach can be used for other third-party or utility-owned distributed generation and storage resources (e.g., local generators connected at the local transmission node).

4. Customer Incentive Mechanism

One element of embodiments of the disclosed resource allocation scheme is the existence of a price (or a signal that acts like a price) that is provided to customers, who then responds to the price or signal. The introduction of such a scheme is complicated by: (1) the unfamiliarity of electricity customers with purchasing power in this way; (2) the technology-laden approach to this resource allocation scheme for the grid and within their premise; and (3) the reluctance of regulators to "abandon" consumers for some form of pure market-driven approach. From the utility perspective, the utility desires to utilize their investment by achieving customer demand responsiveness whenever valuable, not just occasionally. The utility is also concerned about being able to persuade consumers to sign up for service under dynamic pricing schemes, and about how to equitably reward consumers for changing behavior when it is impossible to directly measure what a consumer "would have done" in the absence (the "baseline") of the commodity index (e.g., the price).

The exemplary billing approach described below addresses these issues by introducing, for example, a customer incentive mechanism. According to certain embodiments of the disclosed technology, the resource allocation scheme is implemented by offering consumers an up-front, periodic payment, perhaps in a holding account established in their name, for an assumed level of modifying their demand behavior that may be proportional to their expected annual consumption, and that may be modified by their load shape if data from a recording electric meter is previously available. In such embodiments, for example, the customer can pay their normal utility bill as usual. In addition, the customer is "billed" what in effect is a real-time price for their electricity consumption, but this bill is "paid" by debiting against the payment already provided. An exemplary bill that can be produced according to such a system is illustrated below as Table 6. The debits are desirably not allowed to exceed the balance in the account, and the unspent account balance can be issued to the consumer on a periodic basis (such as when the next up-front payment is made). Thus, according to this embodiment, the customer cannot pay a higher utility bill than they otherwise would, but can earn a significant amount if they modify their demand to minimize their consumption against the real-time price index over time.

This exemplary approach avoids the complexity of determining the baseline in some analytic fashion, and eliminates risk to the consumer from trying an unfamiliar contract mechanism for electricity. Unlike time-of-use and critical-peak pricing schemes, it allows for utilizing of the demand response as a resource at any time by simply adjusting the commodity index.

5. Ancillary Services

One of the primary ancillary services used by the electric power grid is regulation (the very short term (~1 minute) imbalance in energy). This service is typically provided almost entirely by generators that offer to respond to signals from grid control centers to ramp their output up or down rapidly. These signals are sent out at intervals of a few seconds, but the generators themselves can respond instantly due their momentum. The wasted fuel and wear and tear on these generators cause them to charge a premium for this service.

Demand can potentially play a role in providing regulation, since there is often little to no impact in switching a load on or off for short periods, and it can do so almost instantly. However, embodiments of the bulk-resource allocation scheme described above may not be suitable for allocating the regulation resource. This is because the short time scale involved in regulation does not lend itself well to the longer time scale that is typically practical for closing the bulk power markets (e.g., ~1-hour time scale). Instead, an alternative resource allocation scheme having suitable characteristics can be used. For example, according to one exemplary embodiment, the bulk-power market can be operated with a very fast market (e.g., about 5 minutes or less, such as about 1 minute) for regulation services by auctioning off the required amount to the lowest bidders among bulk generators and distribution substations. The latter, in turn, represent the offers by demand and distributed resources to provide such changes. Bypassing the bulk-market for such services is desirable in order to reach the consumer level resources in a timely fashion.

In addition to regulation, there is also the need to allocate resources for other ancillary services, such as spinning and non-spinning reserves. These are fast- and medium-response resources that make up for shortfalls if the generation dispatched by the market fails to occur for some reason, or cannot be delivered through the transmission system. In order to reach customer-level demand and distributed resources that may otherwise be engaged in responding to other, local needs, these signals and regulations can be allocated to specific consumers via the lower-level distribution markets, which are aware of what resources are available and whether sending such a signal is in conflict with, or supportive of, its current objectives. At that point, the distribution market can decide whether and how to pass this opportunity down to the consumer and distributed resources downstream. For example, reserve power (e.g., from a local generator, such as a diesel generator, or local wind or solar power farm) can be offered to the local market node at the distribution level and handled as any other offer to supply power, thus providing reserve power on a short-interval basis that is appropriate to handle unexpected and unforeseen spikes in power usage.

This approach to allocating resources for ancillary services can enhance the value of demand response and distributed resources by providing additional opportunities to assist the bulk power grid and receive payment for that, even beyond those offered by rudimentary market structures attempting to do this today.

6. An Exemplary Topology of a Nested, Hierarchical Resource Allocation Scheme According to the Disclosed Technology FIG. 7 is a schematic block diagram 700 showing an example nested, hierarchical resource allocation for distributed electricity according to the disclosed technology. In particular, FIG. 7 illustrates a first lower-level transmission node market 710 and an interconnected second lower-level transmission node market 712, both of which operate with the same time intervals. In the illustrated embodiment, the time intervals are 5 minutes, though it should be understood that any time interval could be used. In the illustrated embodiment, the transmission nodes for the markets 710, 712 are separate, independent feeders 711, 713, respectively, of the transmission network. For example, the feeders may be feeder networks served by respective distribution substations.

The first feeder 711 serves customers 720, 721, 722 and is configured to receive power from reserve resource 723 (e.g., a spinning or non-spinning reserve), local resource 724 (e.g., a local generator, such as a diesel generator, microturbine, local wind farm, or local solar farm), and transmission substation 725. The feeder 711 is additionally configured to send and receive communications related to each of the consumers 720, 721, 722 and the resources 723, 724, 725.

The second feeder 713 serves customers 730, 731, 732 and is configured to receive power from reserve resource 733 (e.g., a spinning or non-spinning reserve), local resource 734 (e.g., a local generator, such as a diesel generator, microturbine, local wind farm, or local solar farm), and the transmission substation 725. The second feeder 713 is additionally configured to send and receive communications related to each of the consumers 730, 731, 732 and the resources 733, 734, 735.

In some embodiments, the first feeder 711 is also configured to transmit power to or receive power from the second feeder 713. Connection 714 between the first feeder 711 and the second feeder 713 is shown as a dashed line not only because this connection between the feeders is not present in all embodiments, but also because the connection is not necessarily a direct connection. For example, the two feeders 711, 713 may communicate directly with one another (e.g., for purposes of closing their individual markets), but any power transmission between the two may be handled by appropriate switching at the transmission substation 741.

In the illustrated embodiment, the first lower-level transmission node market 710 and the second lower-level transmission node market 712 operate independent, local markets at 5-minute intervals. The markets can be operated according to any of the disclosed techniques (e.g., the techniques shown in FIG. 5 or FIG. 6) and produce unique prices at each of the markets. In embodiments in which the transmission nodes 711, 713 submit and receive bids and offers from another, the market may be synchronous; otherwise, the markets may be operated asynchronously.

The illustrated embodiment also shows higher-level transmission node market 740 at a third transmission node. In the illustrated embodiment, the third transmission node is the transmission substation 741 that is coupled to power resources 750, 751, and 752 (e.g., merchant generators).

In some embodiments, the transmission substation 741 is also configured to transmit power to or receive power from one or more other transmission substations 743 via connection 742. Connection 742 between the transmission substation 741 and the one or more other transmission substations 743 is shown as a dashed line because this connection between the substations is not present in all embodiments.

The transmission substation 741 can operate a higher-level nodal market at longer time intervals than the lower-level transmission node markets 710, 712. In the illustrated embodiment, for example, the higher-level transmission node market 740 operates at 60-minute intervals and operates at the bulk-resource level. The higher-level transmission node market 740 can operate using any of the disclosed techniques described herein (e.g., the techniques shown in FIG. 5 or FIG. 6).

In operation, the higher-level transmission node market 740 can receive bids from the lower-level transmission node markets 710, 712. The bids from the lower-level transmission node markets 710, 712 can be bids that represent the power needs of the markets 710, 712 for the next 60-minute interval. These bids can be based, for example, on aggregating the local bids from the previous period and/or historical data (e.g., data from the previous 24-hour period) that indicates potential power need fluctuations. The bids can also be adjusted to reflect the day of the week, holiday schedules, and/or current weather conditions.

In certain embodiments, the lower-level transmission node markets 710, 712 can submit additional bids for other future time periods (e.g., for time periods beyond the next 60 minutes). Such bids for future time windows can be in addition to the bid for the next time interval and can be used to help secure power and settle the bulk resource market in advance of the actual power needs. In some implementations, such bids for future time windows indicate a future energy need (kWh) rather than an imminent current power need (kW).

In some embodiments, the higher-transmission node market 740 can additionally operate a shorter-interval market (e.g., a 5-minute interval or less, such as a 1-minute interval) for regulation services.

7. Conclusion

Embodiments of the disclosed technology (using any one or more of the disclosed system or methods, alone or in various combinations and subcombinations with one another) can help optimize both local and global index values and deliver the right signals to customers in a timely fashion. Such embodiments can be used to adjust the values offered in space and in time according to local and global conditions, and in proportion to the value that can be provided. The result is to utilize demand response and distributed resources in ways they can provide value in routine operations, while providing the opportunity to reconfigure them quickly and optimally to manage contingencies and assist with outage recovery.

III. Exemplary Embodiments of a Feeder-Level Distribution Allocation Scheme According to the Disclosed Technology A. Introduction The following sections describe specific exemplary embodiments of a demand-response system according to the disclosed technology. In the exemplary embodiments of this section, a feeder is used as the local transmission node (the local market is operated at the feeder level). The feeder can be, for example, a single feeder network served by a distribution substation (which may also serve one or more additional feeder networks). The features disclosed in this section can be adapted and applied to additional nodal transmission markets at the same level (e.g., other feeders) or can be applied to different nodal levels within a nested, hierarchical resource allocation scheme (with appropriate scaling, as necessary).

Furthermore, the exemplary embodiments introduced below assume that the transmission node is not capable of submitting or receiving bids or offers from neighboring transmission nodes.

Additionally, the following sections are in the form of a technical specification (such as a technical specification to be used by a utility implementing the system) that specifies the methods and protocols according to which the exemplary demand response system could be implemented. The following sections additionally describe exemplary methods for resolving prices, an exemplary rate engine for resolving prices, and an exemplary dispatch system for transmitting price data to the active elements in the exemplary demand response system.

In the sections below, the following terms and definitions will be used. It is to be understood that these terms and definitions are used by way of example only, and that other definitions are possible depending on the particular implementation. As used below, the term "real-time balance price" refers to the price at which the total energy supply on the feeder equals the total energy demand for the next interval (e.g., the next 5-minute interval). The term "real-time balance quantity" refers to the total energy supply and demand at the real-time balance price. The term "feeder price" refers to the sum of the actual costs during each interval (e.g., 5-minute intervals). The term "bulk energy price" at the feeder's zone or node refers to the basis price, less a discount to allow for expected losses on the distribution system. The term "real-time price" refers to the price at which total feeder power supply and demand are equal.

B. High-Level Specification

This section outlines high-level features and issues of the exemplary systems that will typically be addressed by a utility implementing a system. In some cases, the features are not defined with specificity because they will vary from implementation to implementation but are readily definable by those of ordinary skill in the art based on the particular implementation, or because the features are not directly relevant to the disclosed technology. In general, the issues to be addressed by a utility implementing the system include, for example: definitions of the responsibilities of participants; hardware or software environments (operating systems, end-user environments, memory and other capacity limitations, performance requirements, and network communications); the availability or volatility of resources; standards compliance; security requirements; interoperability requirements; other interface/protocol requirements; data repository and distribution requirements; and coding guidelines and conventions.

More specific features include:

1. Data System

In certain embodiments of the disclosed technology, a central data system (e.g., a computer system) is used to record information about customers and their energy use. Additionally, the central data system (or localized data system at the transmission nodes) can be used to record one or more of the following at the specified market intervals: a balance-interval sequence number; customer records; feeder records; meter configuration; supply curve; demand curve; feeder balance; or feeder performance metrics.

2. Customer Billing Interval

In certain embodiments of the disclosed technology, a participating residential customer bill is delivered at a regular interval (e.g., monthly) to each customer on a participating feeder. Exemplary forms for the bill, which depend on the particular program in which the customer is participating, are shown below. Furthermore, demand-response billing operations can be implemented for all customers under participating feeders.

3. Request Authentication

In certain embodiments of the disclosed technology, the various data transmissions that are performed as part of the system are transmitted and authenticated using a secure protocol (e.g., the Secure SCADA Communications Protocol (SSCP)).

4. Participating Feeders and Customer Feeder Assignments

In certain embodiments of the disclosed technology, one or more feeders are identified for participation in the demand-response energy pricing system. Typically, customers are associated with a single feeder, and this association can be used to determine which balancing system (discussed in more detail below) the customer participates in.

5. Feeder Reconfiguration

In certain embodiments of the disclosed technology, and in the event of lateral feeder-switching operations during which customers are moved from one feeder to another, the new customer's association can be recorded prior to the next balancing process so that the customer load is included in the balance quantity of the new feeder.

6. Feeder Capacity Reduction

In certain embodiments of the disclosed technology, the operator (e.g., the utility operating the system) has the authority to reduce the feeder capacity at any time, as necessary to ensure the security of the system and protect equipment from damage or excessive degradation, provided the feeder capacity reduction is not indefinite, and further provided that the feeder capacity reduction is not determined by economic considerations.

7. Prioritizing Customers for Demand Response

In certain embodiments of the disclosed technology, customers who decrease consumption during high price periods without disproportionately increasing consumption during low price periods realize savings. (For instance, customers who are unwilling to allow early morning preheating or late morning precooling will miss more than half the possible savings.)

Thus, in certain embodiments of the disclosed technology, it is desirable to select customers who will likely realize the savings as participants in a demand-response program. In particular embodiments of the disclosed technology, the customer load shape can be used to determine which customers are best suited to a demand-response program. Customers are ranked using a correlation analysis of their load shape with the load shape of the utility.

In specific implementations, correlation analysis is performed as follows. Customer load data (e.g., fixed-time data, such as hourly customer load data) is collected for a predetermined period of time (e.g., at least three months). In this example, this data is denoted as a vector X. Feeder load data for that customer (e.g., fixed-time data, such as hourly feeder load data) is also collected for the same period as that for the customer load data. In this example, this data is denoted as vector Y. The correlation coefficient for the $i^{th}$ customer over the time period T can be computed as $$C_i = \frac{\sum_{t \in (1 \ldots T)} (X_i(t) - \overline{X}_i)(Y_i(t) - \overline{Y}_i)}{\sqrt{\sum_{t \in (1 \ldots T)} (X_i(t) - \overline{X}_i)^2 (Y_i(t) - \overline{Y}_i)^2}} \tag{1}$$

Customers with the highest correlation can be given priority in selection for demand-response programs.

8. Plan Selection

In certain embodiments of the disclosed technology, customers are required to select a plan from the plan choices offered. Furthermore, in particular embodiments, residential customers (e.g., all residential customers) connected to a participating feeder are included in the demand-response energy pricing system, regardless of what pricing plan they choose.

The distribution system owner can also select one or more business objectives for the demand-response pricing system. For instance, in one embodiment, the owner is only allowed to select a single business objective. As more fully explained below in the portfolio analysis subsection, the selected business objective helps the distribution system owner realize greater benefit from the demand-response pricing system according to the owner's particular business goals. The metric of a business objective can be computed for one or more evaluation periods (e.g., not less than 1 month). Desirably, the chosen business object is not changed more than once in a selected time period (e.g., every 3 months). As more fully set forth below, a plan portfolio analysis can be performed periodically (e.g., monthly) using the metering data, thus allowing the plan portfolio to be updated accordingly.

Figure 8:
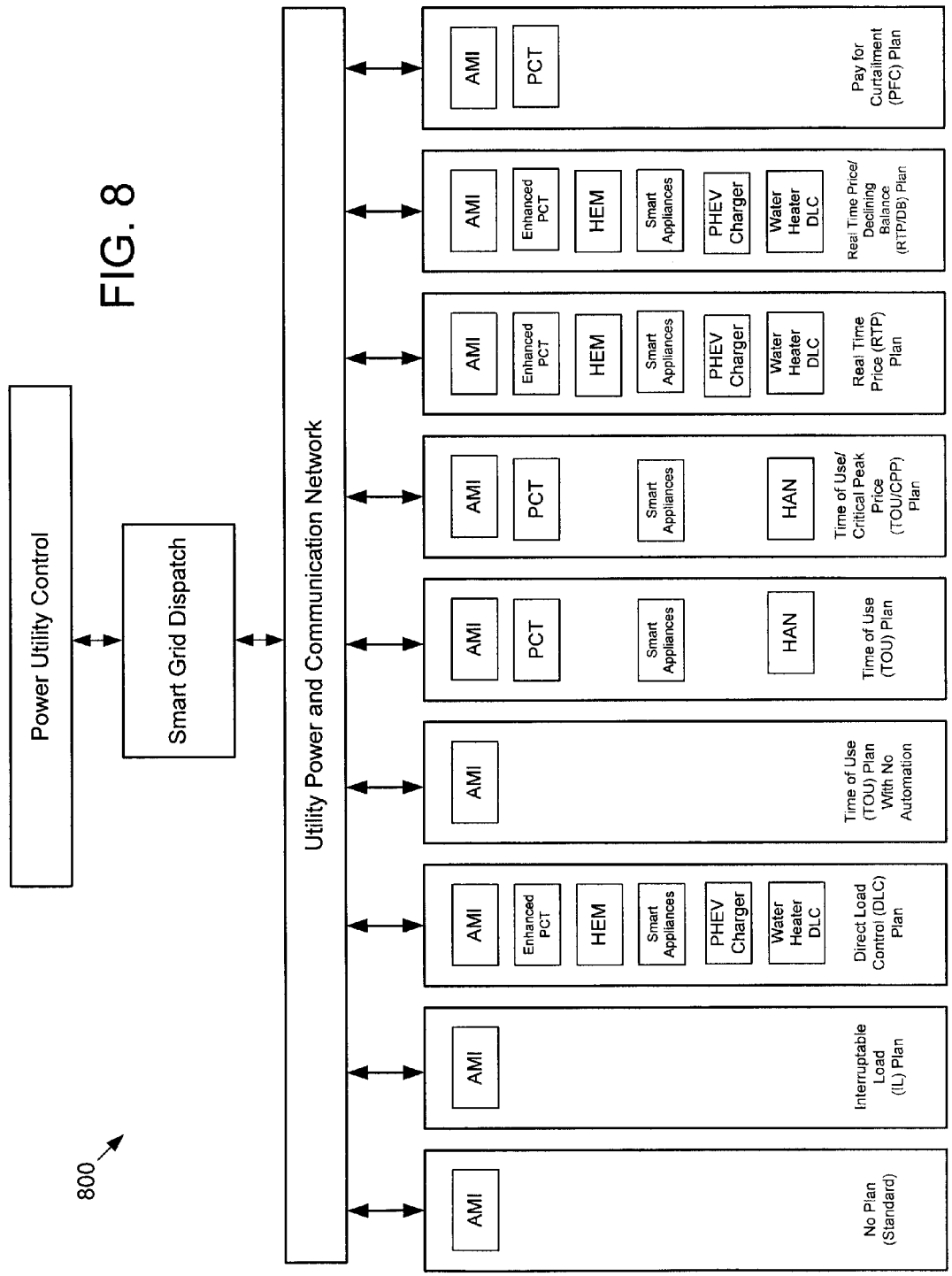
FIG. 8 is a block diagram illustrating various power plans that can be offered by a utility and that use embodiments of the disclosed technology.

In particular embodiments, the types of residential energy pricing plans that are available are those plans shown in block diagram 800 of FIG. 8, though it should be understood that any subset of these plans can be offered and supplemented with one or more other plans (not shown). The plans can be offered to residential customers (all residential customers) on any participating distribution feeder. Furthermore, in order to incentivize participation, the plans can be offered with a guarantee that the customer will not pay more in a given period (e.g., a 12-month period) than they would have paid under a fixed-price plan.

In certain embodiments, a GridLAB-D model (or other suitable computer simulation model) can be created of the residential customers on each plan. This model can be used to generate simulations to support the various procedures for which no data exists, including, but not limited to, one or more of the following: (a) baseline home energy response to weather; (b) home end-use and appliance energy response to weather, load control, and price signals; and (c) aggregate residential response to weather, load control, and price signals. Any suitable number of homes can be modeled in each plan (e.g., between 25 and 100 for each plan). For the purposes of forecasting behavior, the TMY weather data provided with GridLAB-D can be used.

9. Critical Peak Events

In certain embodiments of the disclosed technology, the operator is permitted to call a critical-peak event for up to a selected number of hours in a given day (e.g., 4 consecutive hours in any given day), provided that the operator does not call more than a maximum number of events (e.g., 10 critical peak events in any single 12 month period), and further provided that the operator gives appropriate notice (e.g., 24-hour notice) to all affected customers prior to the start of the first hour for which the critical-peak price is in effect. The number and necessary warning of critical peak events may depend on the jurisdiction in which the technology is implemented.

D. System-Level Specification

Block diagram 800 of FIG. 8 is a schematic block diagram illustrating an overall structure of the system according to certain exemplary embodiments of the disclosed embodiments. In particular, block diagram 800 outlines various exemplary plans that can be implemented with the system. Details of the plans are described in greater detail below. For each of the plans, block diagram 800 also includes an indication of which hardware can be used with the plan. For instance, all plans are implemented using an automated metering infrastructure ("AMI"). Certain plans can further utilize a programmable control thermostat ("PCT"), home energy management system ("HEM"), smart appliances (e.g., appliances that operate in response to price), a plug-in hybrid vehicle ("PHEV"), and/or an appliance with direct load control ("DLC"). FIG. 8 also shows that the various plans can be implemented over the utility's power and communication network using a smart grid dispatch network (comprising, for example, a plurality of transmission nodes operating a plurality of transmission node markets according to any of the disclosed embodiments), which are all controlled by the power utility itself.

The subsections below outline system-level features and issues related to the system illustrated in FIG. 8. In some cases, the features are not defined with specificity because they will vary from implementation to implementation, but are readily definable by those of ordinary skill in the art based on the particular implementation, or because the features are not directly relevant to the disclosed technology.

1. Metering

In certain embodiments of the disclosed technology, customer metering is performed at fixed-time intervals (e.g., five-minute intervals) for customers, and fixed-time-interval load observations (e.g., five-minute load observations) are delivered to the demand-response dispatch system (e.g., the system operating the local nodal market) in the form of a demand submission before the next observation and balancing interval begins (e.g., within five minutes of the observation and before the next five-minute balancing interval begins).

In the event this information cannot be provided as specified, one of the following alternatives can be employed (either in the indicated order of preference or in another order): (a) have the Home Energy Management Systems ("HEMS") measure the previous interval energy consumption (e.g., the previous five-minute energy consumption) and transmit it every time interval (e.g., every five minutes) in a separate sub-metering message; (b) embed the previous interval energy consumption (e.g., the previous 5-minute energy consumption) in the demand submission; or (c) average the energy consumption over a fixed time interval (e.g., a 15-minute interval) supported by the meter.

2. Records

The following subsections describe various records that can be maintained in embodiments of the disclosed technology.

a. Customer Records

In certain embodiments of the disclosed technology, customer information is maintained (e.g., as a variable-interval time series). In particular implementations of the disclosed technology, the customer information record includes one or more (e.g., all) of the following (where the particular names of the data are for example purposes only and should not be construed as limiting):

meter_id. The meter_id relation can be included to identify the meter that is used for demand-response system management and billing. This can be the primary index for this information;

customer_id. The customer_id relation can be included only if it is not available in real time from another source through the meter_id relation;

update_time. The record date;

feeder_id. The meter's feeder or lateral relation can be included if it is not available in real time from another source through the meter_id relation;

rate_plan. The customer's chosen rate plan can be an enumeration of FIXED, TOU, DLC, PFC, or RTP with option extensions separated by a "/" (e.g., M, A for manual or automated, C for critical peak program, and D for declining balance incentive);

billing_plan. The customer's chosen billing plan can be an enumeration of STANDARD, or DEBIT;

last_read. The date of the last meter reading can be included if it is not available from another source through the meter_id relation;

last_bill. The date of the last billing can be included if it is not available from another source through the meter_id relation;

last_balance. The balance due (in $) as of the last billing can be included if it is not available from another source through the meter_id relation; and last_settled. The date of the last payment received or credit given can be included if it is not available from another source through the meter_id relation.

b. Device Records

In certain embodiments of the disclosed technology, device record information is maintained by one or more devices (e.g., devices that are configured to interact with the HEMS). In particular implementations of the disclosed technology, the device record information includes one or more (e.g., all) of the following (where the particular names of the data are for example purposes only and should not be construed as limiting):

device_id. The device identification number can be a unique key;

customer_id. The customer identification number can identify the customer whose account this device operates against;

activation_date. The date and time at which the device was first encountered;

last_activity. The date and time at which the device was last active;

last_quantity. The quantity at which the device was last active;

last_price. The price at which the device was last active;

min_quantity. The lowest quantity observed with this device;

max_quantity. The highest quantity observed with this device;

min_price. The minimum price observed with this device; and max_price. The maximum price observed with this device.

c. Feeder Records

In certain embodiments of the disclosed technology, feeder configuration records are maintained (e.g., as a variable-interval time series). In particular implementations of the disclosed technology, the feeder configuration record includes one or more (e.g., all) of the following (where the particular names of the data are for example purposes only and should not be construed as limiting):

feeder_id. The feeder_id can be the unique identification number and can be used as the primary index. In certain implementations, the value NULL is not permitted and the default value is automatically incremented for each new record;

update_time. The update_time can be the number of seconds since a fixed start date (e.g., 1/1/1970 0:00:00 UTC) at which the configuration goes into effect. More recent records can supersede previous records; and current_limit. The current_limit can specify the maximum current (in amps) permitted on the feeder. In certain implementations, the value NULL is not permitted and the default value is 0.

d. Meter Configuration Records

In certain embodiments of the disclosed technology, meter configuration records are maintained. In particular implementations of the disclosed technology, the meter configuration record includes one or more (e.g., all) of the following (where the particular names of the data are for example purposes only and should not be construed as limiting):

meter_id. The meter_id can be the primary identification field;

update_time. The date and time of the record;

feeder_id. The feeder_id relation can be included to identify the feeder that is used for demand-response system management and billing; and current_limit. The maximum current permitted on the meter (in Amps).

e. Supply Curve Records

In certain embodiments of the disclosed technology, supply curve records are maintained. For example, the supply-request data can be collected continuously and can be processed within a short interval (e.g., one second) of when it is received. In particular implementations of the disclosed technology, the supply curve record information includes one or more (e.g., all) of the following (where the particular names of the data are for example purposes only and should not be construed as limiting):

receipt_time. The time at which the request was received;

log_time. The time at which the request was logged;

interval_id. The balance-interval sequence number with which the request is associated;

meter_id. The meter id;

quantity. The quantity (in kW); and price. The price (in $/MWh). In some implementations, this price is indicative of the minimum price at which the resource will be produced.

f. Demand Curve Records

In certain embodiments of the disclosed technology, demand curve records are maintained. For example, the demand-request data can be collected continuously and can be processed within a short interval (e.g., one second) of when it is received. In particular implementations of the disclosed technology, the demand curve record information includes one or more (e.g., all) of the following (where the particular names of the data are for example purposes only and should not be construed as limiting):

receipt_time. The time at which the request was received;

log_time. The time at which the request was logged;

validation_flag. A boolean value to indicate whether the record is valid;

interval_id. The balance-interval sequence number with which the request is associated, meter_id. The meter id;

device_id. The appliance or device id;

quantity. The quantity (in kW); and price. The price (in $/MWh). In some implementations, this price is indicative of the maximum price at which the requesting device is willing to pay for the resource.

g. Feeder Balance Records

In certain embodiments of the disclosed technology, feeder balance records are maintained. For example, the feeder balance data can be collected at regular intervals (e.g., once every five minutes) for each feeder. In particular implementations of the disclosed technology, the feeder balance record information includes one or more (e.g., all) of the following (where the particular names of the data are for example purposes only and should not be construed as limiting):

interval_id. The balance-interval sequence number with which the request is associated;

feeder_id. The feeder number;

quantity. The balance quantity (in kW);

price. The balance price (in $/MWh);

avg24. The average balance price over the past day (in $/MWh);

std24. The standard deviation of the balance price over the past day (in $/MWh);

avg72. The average balance price over the past 3 days (in $/MWh);

std72. The standard deviation of the balance price over the past 3 days (in $/MWh);

avg168. The average balance price over the past week (in $/MWh); and std168. The standard deviation of the balance price over the past week (in $/MWh).

h. Feeder Performance Metrics Records

In certain embodiments of the disclosed technology, feeder performance metrics records are maintained. For example, the feeder performance metrics can be collected at regular intervals (e.g., once every five minutes) for each feeder. Further, the data for each interval can be provided within a fixed time of the close of the interval (e.g., within 32 days of the close). In particular implementations of the disclosed technology, the information in the feeder performance metric record includes one or more (e.g., all) of the following (where the particular names of the data are for example purposes only and should not be construed as limiting):

interval_id. This identifies the balance-interval sequence number with which the request is associated;

feeder_id. This identifies the feeder number;

day_ahead_load. This records the day-ahead forecast feeder average power for this interval (in kW).

hour_ahead_load. This records the hour-ahead forecast feeder average power for this interval (in kW).

expected_energy. This records the feeder energy expected to be consumed by the feeder during the interval (in kWh).

actual_energy. This records the actual feeder energy consumed by the feeder during the interval (in kWh).

peak_power. This records the peak power consumed by the feeder during the interval (in kW).

day_ahead_price. This records the day-ahead nodal energy price for the interval (in $/MWh).

hour_ahead_price. This records the hour-ahead energy price for the interval (in $/MWh).

imbalance_energy_price. This records the real-time nodal cost of imbalance energy for the feeder (in $/MWh).

settled_energy_price. This records that actual settled nodal price of energy for the feeder during the interval (in $/MWh).

energy_sold. This records that actual energy delivered to customers (in MWh).

energy_sales. This records the actual energy sales to customers (in $).

net_revenue. This records the actual net revenue for the feeder over the interval (in $); this is typically: energy_sales−(actual_energy×settled_energy_price).

asset_utilization. This records the actual asset utilization for the feeder (in units).

carbon_emissions. This records the estimated carbon emissions associated with the feeder during the interval (in tons).

i. Balance Interval Sequence Number Records

In certain embodiments of the disclosed technology, balance interval sequence number records are maintained. The balance-interval sequence number can be the unique identification number associated with each interval (e.g., each five-minute interval) during which the distribution system balance is calculated. In particular embodiments, the balance interval sequence number can be the integral portion of the result obtained when the number of seconds between the fixed start date (e.g., Jan. 1, 1970 0:00:00 UTC) and the beginning of the interval is divided by 300. Further, the number of seconds since the fixed start date (e.g., Jan. 1, 1970 0:00:00 UTC) of the beginning of the interval can be calculated by multiplying the interval sequence number by 300.

3. Constrained Participating Feeder

A participating feeder can be deemed constrained if the actual feeder current has exceeded a selected percentage (e.g., 80%) of the feeder current limit at any time during the period of performance.

4. Real-Time Distribution-Balancing System

The real-time price can be computed for every interval (e.g., five-minute interval) on each feeder. Furthermore, in certain embodiments, for every interval there is at least one supplier of energy on each feeder.

a. Real-Time Price Determination

In certain embodiments, the following techniques are used to perform real-time price determinations:

Supply-curve development: The supply curve can be developed by (a) sorting the supply submissions by ascending price, provided larger quantities at the same price are listed first; and (b) taking the cumulative sum of the sorted submission quantities.

Demand curve development. The demand curve can be developed by (a) sorting the demand submissions by descending price, provided larger quantities at the same price are listed first; and (b) taking the cumulative sum of the sorted submissions quantities.

Balance price determination. The intersection of the supply and demand curves can determine the balance price and quantity, provided that if there is more than one balance price for the balance quantity, then the balance price can be the average of the minimum and maximum price for which a balance quantity exists, and furthermore provided that if there is more than one balance quantity for the balance price, then the balance quantity can be the average of the minimum and maximum quantities for which a balance price exists.

Balance price announcement. The balance price for a feeder can be broadcast to all meters using the following exemplary message format:

```
struct price_msg {
    enum {RMT_PRICE=200} status; // 32 bit msg id
    long price; // balance price (in cents/MWh)
    long stdev; // balance price deviation (in cents/MWh)
    unsigned long long valid_to; // timestamp of expiry
};
``` where "price" is the new balance price, "stdev" is the fractional deviation of the price with respect to the average balance price over the past 24 hours, and "valid_to" is the time at which the balance price expires.

b. Prices for Customers and Suppliers

In certain embodiments, all customers on the real-time price plan can pay the real-time price for energy, and all suppliers can receive this price for energy.

c. Critical Peak Prices

In one particular implementation, the critical-peak price during critical-peak events is not less than 10 times the off-peak price and not more than 10 times of on-peak price. However, these values can vary depending on the implementation.

5. Supply and Demand Curves

Both suppliers and consumers can be permitted to submit supply and demand requests to the real-time distribution-balancing system.

a. Feeder Supply

The feeder itself can participate in the supply curve for each interval (e.g., each 5-minute interval) during which it is energized. If the feeder is not energized, it does not submit a supply curve.

The feeder capacity can be based on the supply voltage at the feeder limit current and only the real power quantity can be submitted, excluding expected losses between the feeder secondary and the meter primary.

6. Generation Resources

Resources at the substation that supply or consume energy can participate in the balancing system as appropriate (supply or demand, respectively).

7. Exemplary Strategies for Determining Offer Prices for Generation Resources

The following subsections outline exemplary strategies for determining the offer price for a variety of resources:

a. Diesel Generation

Diesel generators can submit their fuel cost plus startup cost when off; fuel cost less shutdown cost when operating less than their minimum time; and fuel cost only when operating more than a minimum runtime. Any generators with annual runtime licenses can increase (or decrease) their prices according to the fraction of time they have overused (or underused) their license, pro rata.

In one exemplary embodiment, the bid price can be calculated as $$P = \rho(C_f + C_v + C_s) \quad (2)$$

where $\rho$ is the license premium, $C_f$ is the fixed cost (O&M, etc.) for the license period, $C_v$ is the variable cost (fuel, etc.) for the bid period, and $C_s$ is the start/stop cost.

The license premium $\rho$ can be computed based on the number of license hours for the generator granted for environmental reasons. The license premium can be computed as follows:

$$\rho = k_\rho \frac{N-n}{N} \frac{M}{M-m} \quad (3)$$

where $k_\rho$ is a scaling factor less than 1 that determines how conservative the bidding strategy is (values of $k_\rho$ that are smaller tend to use the remaining license hours sooner and leave less for the end of the license period), N is the number of hours in the license period (typically 8760), n is the current hours in the license (counts up from 0 to N hour by hour), M is the total number of license hours granted (typically 100), and m is the total number of license hours used (counts up from 0 to M hour by hour).

The variable cost $C_v$ can include the generator efficiency such that $$C_v = C_{fuel}/\rho_{fuel} \quad (4)$$

where $C_{fuel}$ is the cost of the fuel (per unit, e.g., $/gal.), $\rho_{fuel}$ is the conversion rate of the generation (MWh/gal).

The fixed cost $C_f$ can include the O&M costs amortized over the licensed run hours:

$$C_f = \frac{C_{total}}{MQ_{avg}} \quad (5)$$

where $C_{total}$ are the total O&M costs, and $Q_{avg}$ is the expected average running capacity of the generator.

The start/stop cost can include the startup cost for a unit that is stopped and the cost, if any, for shutting down a unit prematurely:

$$C_S = \begin{cases} \dfrac{C_{start}}{Q_{bid} t_{req}}: & t_{run} = 0 \\ \dfrac{C_{stop}}{Q_{bid}(t_{req} - t_{run})}: & 0 < t_{run} < t_{req} \\ 0: & t_{run} \geq t_{req} \end{cases}$$

where $C_{start}$ is the startup cost per event, $Q_{bid}$ is the expected average quantity bid over the required minimum runtime, $t_{req}$ is the required minimum runtime for no-cost shutdown, $t_{run}$ is the actual runtime since that last startup, $C_{stop}$ is the premature shutdown cost per event.

b. Intermittent/Renewable Resources

In certain embodiments, intermittent/renewable resources can submit all supply requests at zero price. Other pricing methods can be used in other embodiments (e.g., pricing methods similar to the other pricing methods disclosed herein or methods designed to recoup constructions costs over a predetermined period of time).

c. Battery Storage

Battery storage units can submit both supply and demand requests, at two different prices such that the supply price is higher than the demand price. For example, if the real-time balance price is equal to or lower than the battery's demand price, the battery can charge itself; if the real-time balance price equals or exceeds the battery's supply price, the battery can discharge; and if the real-time balance price is between the supply and demand price, the battery can do nothing. Optionally, when the real-time balance price equals either the supply or demand price, the battery can be deemed the marginal resource and can be required to be available for ancillary service control.

d. Substation Resources

Resources located on the substation's secondary side can discount their quantities by the distribution loss for the feeder that they supply. Resources located on the substation's primary side can be prevented from submitting supply requests on any particular feeder.

8. Demand Resources

To the extent possible, the existing automated metering infrastructure can be used as a gateway to service participating residential Real-Time Pricing ("RTP") equipment.

Customers' meters can submit at least one demand request at fixed intervals (e.g., every five minutes) for the non-responsive load operating at the premises with no variable price (e.g., zero or the maximum price allowed to ensure that power for the non-responsive load is obtained).

For a customer load that is price-responsive, the customer meter can submit a distinct demand request for the quantity demanded and the price above which it is willing to forgo demand. For each such responsive load, a separate and distinct demand request can be made.

9. Exemplary Strategies for Determining Demand Prices a. Electric Space Heating

A customer who has chosen the real-time price plan can be provided with a price-based heating thermostat. When heating is enabled in a customer's home and $T_{obs} \leq T_{max}$, the customer's thermostat can submit at least one demand request periodically (e.g., every 5 minutes) prior the start of the balance process. In particular embodiments, the formula for the demand price is based on the price deviation $$P_{dev} = \begin{cases} 1/\eta_{heat} \dfrac{T_{des} - T_{obs}}{T_{min} - T_{des}} & T_{obs} \leq T_{des} \\ 1/\eta_{heat} \dfrac{T_{des} - T_{obs}}{T_{des} - T_{max}} & T_{obs} > T_{des} \end{cases} \quad (6)$$

such that the submission price for demand is $$P_{submit} = \begin{cases} P_{cap}: & P_{dev} < -3 \\ P_{avg} - P_{dev} P_{std}: & -3 \leq P_{dev} < 3 \\ -P_{cap}: & P_{dev} \geq 3 \end{cases} \quad (7)$$

where $P_{cap}$ is the price cap, which can be \$9999/MWh. Values of $\eta$ are defined analogously to demand elasticity except that the sign is changed (e.g., 0 means no demand response to price and increasing value increases demand response, with $\eta=1=\$P_{std}/°$ F.)

If the load is active, then the current load can be the demand quantity and the SMF_LOADACTIVE flag (see the exemplary curve submission protocol set forth above) can be set. Otherwise, the load is inactive and the demand quantity can be the last observed load when active and the SMF_LOADACTIVE flag can be cleared.

Furthermore, the thermostat can adjust the heating setpoint periodically (e.g., every 5 minutes) when the balance price is broadcast. In particular implementations, the formula for the setpoint is based on the temperature deviation:

$$T_{dev} = \eta_{heat} \dfrac{P_{clear} - P_{avg}}{P_{std}} \quad (8)$$

such that $$T_{set} = \begin{cases} T_{max} & T_{dev} \leq -1 \\ T_{dev}(T_{des} - T_{max}) + T_{des} & -1 < T_{dev} \leq 0 \\ T_{dev}(T_{min} - T_{des}) + T_{des} & 0 < T_{dev} \leq 1 \\ T_{min} & T_{dev} > 1 \end{cases} \quad (9)$$

This approach can be used for any heating device with an electronically controlled thermostat.

b. Air Conditioning

A customer who has chosen the real-time price plan can be provided with a price-based air-conditioning thermostat. When cooling is enabled in a customer's home and $T_{obs} > T_{max}$, the customer's thermostat can submit at least one demand request periodically (e.g., every 5 minutes) prior the start of the balance process. In particular embodiments, the formula for the demand price is based on the price deviation:

$$P_{dev} = \begin{cases} \dfrac{1}{\eta_{cool}} \dfrac{T_{des} - T_{obs}}{T_{min} - T_{des}} & T_{obs} \leq T_{des} \\ \dfrac{1}{\eta_{cool}} \dfrac{T_{des} - T_{obs}}{T_{des} - T_{max}} & T_{obs} > T_{des} \end{cases} \quad (10)$$

such that the submission price for demand is $$P_{submit} = \begin{cases} -P_{cap}: & P_{dev} < -3 \\ P_{avg} + P_{dev} P_{std}: & -3 \leq P_{dev} < 3 \\ P_{cap}: & P_{dev} \geq 3 \end{cases} \quad (11)$$

Values of $\eta$ can be defined analogously to demand elasticity except that the sign is changed (e.g., 0 means no demand response to price and increasing value increases demand response, with $\eta=1=\$P_{std}/°$ F.).

If the load is active, then the current load can be the demand quantity and the SMF_LOADACTIVE flag (see the exemplary curve submission protocol set forth above) can be set. Otherwise, the load is inactive and the demand quantity can be the last observed load when active and the SMF_LOADACTIVE flag can be cleared.

Furthermore, the thermostat can adjust the cooling setpoint periodically (e.g., every 5 minutes) when the balance price is broadcast. In particular embodiments, the formula for the setpoint is based on the temperature deviation $$T_{dev} = \eta_{heat} \dfrac{P_{avg} - P_{clear}}{P_{std}} \quad (12)$$

such that $$T_{set} = \begin{cases} T_{max} & T_{dev} \leq -1 \\ T_{dev}(T_{des} - T_{max}) + T_{des} & -1 < T_{dev} \leq 0 \\ T_{dev}(T_{min} - T_{des}) + T_{des} & 0 < T_{dev} \leq 1 \\ T_{min} & T_{dev} > 1 \end{cases} \quad (13)$$

This approach can be used for any cooling device with an electronically controlled thermostat.

c. Electric Water Heating

Demand-responsive water heaters that use mechanical (e.g., bimetal) thermostatic controls can be made price responsive by using an asymmetric strategy (i.e., a no-bid strategy). In particular embodiments, the submission agent does not submit a bid when submitting the quantity. Instead, when the balance price is broadcast, the controller can use a probability, $\rho$ to determine whether the waterheater is to be curtailed during the next balancing interval:

$$\rho = \begin{cases} 0 & P_{dev} \leq 0 \\ \eta_{hw}\left[2\left(\int_0^{P_{dev}} N(x)dx\right) - 1\right] & P_{dev} > 0 \end{cases} \quad (14)$$

where $\eta_{hw}$ is the price sensitivity of the hotwater heater controller, N is the standard normal distribution, and $P_{dev}$ is defined as above for electric space heating.

A practical implementation is to generate a uniform random number between 0 and 1 at periodic intervals (e.g., each 5-minute interval). Water heater operation can then be curtailed if the random number falls below the value of ρ.

This approach can be used for heating devices with mechanically controlled thermostats when only interruption of the load is possible and it is not possible to turn the load on when the thermostat has turned it off. Electronically controlled water heaters with fully controlled thermostats can use the electric space heating control strategy above.

d. Electric Vehicle Chargers

For electric vehicle chargers, and particular embodiments of the disclosed technology, the charge state deviation is $$C_{dev} = \begin{cases} \frac{1}{\eta_{evc}} \frac{C_{des} - C_{obs}}{C_{des} - C_{max}} & C_{des} < C_{max} \\ 0 & C_{des} = C_{max} \end{cases} \quad (15)$$

where $C_{des}$ is the desired state of charge at the given time; $C_{max}$ is the final state of charge; and $\eta_{evc}$ is the price responsiveness of the electric vehicle charger.

Note that in particular implementation, values of $\eta_{evc}$ that are less than 1.0 will have low sensitivity to price and will generally result in a higher likelihood of achieving the desired state of charge at the end of the interval, but offer fewer opportunities for cost savings. Values of $\eta_{evc}$ that are greater than 1.0 will have a high sensitivity to price and will generally result in a lower likelihood of achieving the desired state of charge at the end of the interval but offer the potential for greater cost savings.

In particular embodiments, the submission price is $$P_{submit} = P_{avg} + P_{std} C_{dev} \quad (16)$$

provided the price is positive. If $P_{submit}$ is negative, the submission price is $0/MWh. The submission quantity is based on the maximum charge rate, $R_{max}$. The decision to operate the charge for the next interval can be determined by:

$$R_{set} = \begin{cases} R_{max} & P_{clear} \leq P_{submit} \\ 0 & P_{clear} > P_{submit} \end{cases} \quad (17)$$

where $P_{clear}$ is the balance price cleared for the next interval. This approach can be used for residential energy storage devices when discharge with energy flow back into the distribution system is not permitted.

10. Home Energy Management System

In certain embodiments, home energy management systems ("HEMS") can be used to allow the customer to control the various settings for the demand response system from a single portal. These can include periodic schedules (e.g., weekly schedules) of occupancy-based values (e.g., hourly occupancy-based values) for one or more of the following:

Exemplary electric heating control parameters: $T_{des}$ is the desired indoor air-temperature when heating; $T_{min}$ is the minimum allowable indoor air-temperature when heating; $T_{max}$ is the maximum allowable indoor air-temperature when heating; and $\eta_{heat}$ is the price sensitivity of the indoor temperature when heating.

Exemplary air-conditioning control parameters: $T_{des}$ is the desired indoor air temperature when cooling; $T_{min}$ is the minimum allowable indoor air temperature when cooling; $T_{max}$ is the maximum allowable indoor air temperature when cooling; and $\eta_{cool}$ is the price sensitivity of the indoor temperature when cooling.

Exemplary water-heating control parameters: $\eta_{hw}$ is the price sensitivity of the hot water temperature. In particular embodiments, the following are only available when electronically controlled water heating is available: $T_{des}$ is the desired hot water temperature; $T_{min}$ is the minimum allowable hot water temperature; and $T_{max}$ is the maximum allowable hot water temperature Exemplary electric-vehicle charger control parameters: $C_{des}$ is the current desired state of charge; $C_{max}$ is the maximum state of charge allowed; and $\eta_{evc}$ is the price sensitivity of the electric vehicle charger 11. Feeder Submission Quantity In certain embodiments, if the customer meters are not required to submit the unresponsive portion of their total demand periodically (e.g., every five minutes) or submit zero as their price, then the feeder can be required to submit, as a single unresponsive demand, the difference between the observed feeder load and all the loads submitted (both responsive and unresponsive) at the time of the balance closing, which can be computed as follows:

$$Q_{unresponsive} = Q_{total} - \Sigma Q_{responsive} \quad (18)$$

(Note that feeders that are current limited desirably compute the feeder capacity based on the total load at the observed voltage.)

12. Non-Paralleling Generation

Any customer generation resource that is installed as a load-shed or backup generation resource can determine the demand request price of the non-responsive load operating at the premises. In particular implementations, a non-paralleling generation unit is not permitted to submit a supply request.

13. Encrypted Supply and Demand Curve Submission

The supply and demand curves that are transmitted as part of embodiments of the disclosed technology can be submitted using one or more encrypted messages. For example, in one particular implementation, the encrypted messages contain the following information:

```
struct submit_msg {
    enum {SMT_SUPPLY=0, SMT_DEMAND=1} type; // 32 bit msg id
    unsigned long meter_id;        // unique meter id
    unsigned short flags;          // message flags
    unsigned short device_id;      // device id is unique within scope of meter
    unsigned long quantity;        // power in Watts
    long price;                    // price in cents/MWh
};
```

The message flags for curve submissions are as follows
define SMF_UNRESPONSIVE 0x0001//load is not price responsive
define SMF_LOADACTIVE 0x0002//load is currently "on"

Requests that fail to meet the qualifications for a valid supply or demand request can be rejected using the following response message:

```
struct rejection_msg {
    enum {RMT_REJECTED=101} status; // 32 bit msg id
    enum {
        RRC_FORMAT   = 0x00, // The message format is not valid.
        RRC_IDENTITY = 0x01, // The meter id is not valid.
        RRC_AUTHENTIC = 0x02, // The submission cannot be
                              authenticated.
        RRC_CAPACITY = 0x03, // The submission capacity exceeds
                              limits.
```

-continued

```
    RRC_PRICE   = 0x04, // The submission price exceeds limits.
  } reason_code;          // Rejection-reason code
  unsigned long data;     // Supplemental data
};
```

Requests that do not meet the formatting requirements can be rejected with reason_code 0x00 and the explanation can be "The request does not comply with the required format." Requests that do not provide a valid meter identification can be rejected with reason_code 0x01 and the explanation can be "The request does not identify a valid meter." Requests that fail to provide correct authentication can be rejected with reason_code 0x02 and explanation "The request cannot be authenticated." Requests that exceed the rated limit of the distribution system at the point of service can be rejected with reason_code 0x03 and explanation "The quantity exceeds the rated capacity at point of service." Requests that exceed the allowed price range $−9999/MWh to $+9999/MWh can be rejected with reason_code 0x04 and explanation "The price is not within the permitted range."

The response can be provided as a message of the form:

```
struct response_msg {
  enum {RMT_OK=100} status;        // status response
  enum {RRT_SUPPLY=0,              // response to a supply (re)submission
        RRT_DEMAND=1,              // response to a demand (re)submission
        RRT_WITHDRAWN=2,           // response to a submission
        withdrawal
  } type;                          // response message type
  unsigned long long record_id;    // unique record identifier
  unsigned long valid_to;          // timestamp of expiry
};
``` where record_id is the unique record identifier for the request, and valid_to is the time at which the request will expire (the time at which the request will be used to produce a new balance price and it can no longer be resubmitted or withdrawn).

In certain embodiments of the disclosed technology, a supplier or customer is permitted to resubmit any part of their supply or demand curve provided they have a record_id and they resubmit that part of the curve before the balance process begins. The record_id can be used to replace a portion of the curve using the message

```
struct resubmit_msg {
  enum {SMT_RESUBMIT=2} type;       // message type
  unsigned long flags;              // message flags
  unsigned long long record_id      // unique record identifier
  unsigned long quantity;           // power in Watts
  long price;                       // price in cents/MWh
};
``` with the same flags as a "submit" message and the corresponding response (e.g., supply or demand as appropriate, or the appropriate rejection response).

Supplier and/or customers can be permitted to withdraw a previously submitted request using the message format

```
struct withdraw_msg {
  enum {SMT_WITHDRAW=3} type;       // 32 bit msg id
  unsigned long flags;              // message flags
  unsigned long long record_id;     // unique record identifier
};
```

The response is as indicated by the response message or the appropriate rejection response.

(1) Security Key Information

In certain embodiments, the meter_id, private_key, interval_id, and sequence_id can be used to encrypt the message before it is transmitted by the meter. For example, the address of the meter can be used to determine the current key. The sequence_id can be incremented after each message is sent, and it can be reset to 0 when the interval_id is incremented. In the event of key failure, the recipient can assume that a message was dropped and attempt to decode the message using twice the number of sequence_id values as the number of messages received in the last interval. If the attempt is successful, then the response can indicate an authentication failure and the response message data can include the number of missed messages inferred so that the sender can adjust sequence_id and resend the message with the correct sequence id. If the attempt is unsuccessful, then the response message data can contain the value 0. The sender can also use the information to resend any missed messages.

The private key for each meter can be synchronized periodically (e.g., once a month) using an appropriate encryption protocol (e.g., Diffie-Hellman key exchange).

14. Plan Administration a. Payment Plans

Residential customer can be permitted to use the standard monthly-bill payment plan or a debit plan. Customers on the debit plan can either prepay their bills or incentive funds can be deposited in advance and consumption can be deducted from their accounts.

b. Pricing Plan

Customers can be permitted to pay for electric energy under more than one pricing plan, provided that no single residential customer is permitted to pay for electric energy under more than one pricing plan during any single billing period.

c. Plan Reselection

Customers can be permitted to change their plan selection when they pay their monthly bills without incurring a penalty (except for a nominal administrative fee), provided that they pay the current month's net incentive difference, should it be negative. (Exemplary customer incentive mechanisms are discussed in more detail below.) The net incentive difference can be computed, for example, by deducting the incentive for the plan the customer is leaving from the incentive of the plan the customer is choosing. If the net incentive difference is negative, then in order to change plan type the customer can be required to pay the difference, which can be posted against their next bill. If the net incentive difference is positive, the customer can be given a credit for the net incentive difference, which can be applied to their next bill.

d. Non-Responsive Customers

Residential customers on a participating feeder who are not participating in the real-time price plan can be designated non-responsive customers for the purpose of computing the real-time price.

e. Non-Residential Customers

Non-residential customers can continue to pay for energy under the existing plan offerings, provided that their total load is considered the same as that of a non-responsive customers for the purpose of real-time price determination.

f. Reconcilliation

Real-time prices are based on the availability of accurate 5-minute prices from the wholesale bulk-energy market. However, it is expected that some prices will not be accurate and that the wholesale bulk-energy market maker will amend some price ex-post. When this occurs, all costs and credits incurred can be accrued to compute the reconciliation fee for the following month. The previous month's reconciliation cost can be allocated uniformly across all periodic (e.g., five-minute) intervals of the current month.

15. Plan Types a. Advance-Payment Plans

Customers who elect to participate in the advance-payment plan have prepaid amounts credited to their accounts upon receipt of the funds. When the funds have been exhausted the customer can be disallowed to purchase additional energy without having cleared the credit check required for other customers.

b. Prepaid Incentive Plan

Customers who elect to participate in the prepaid-incentive plan have the prepaid incentive credited to their account each month. The incentive prepayment and adjustments can be calculated using the residential energy forecast.

The customer can pay the fixed price of all energy actually consumed each month, regardless of what plan was chosen. Additionally the cost of energy according to the chosen plan can be deducted from the incentive account. The balance remaining in the incentive account can be repaid monthly (or at other intervals) by check or other means to the customer, or credited to their account against future charges, according to the customer's preference. The prepaid incentive plan is slightly different from the annual "no-loss" approach because the no-loss approach, in some embodiments, applies monthly, which means that a customer can profit highly from a vacation. If the funds in the incentive account are depleted during any single time period (e.g., any month), the customer is desirably not billed for any negative balance, nor is the customer given a credit for any over-billing.

c. Fixed-Price Plan

Customers who choose to pay for energy under a fixed-price plan pay the same price per unit of energy at all times of day, week, month, and year. The fixed price of energy is desirably the same as that for residential customers in who are not on participating feeders.

d. Interruptible Load

Customers who choose to pay for energy under an interruptible-load pricing plan pay a discounted fixed price per unit of energy at all times of day, week, month, and year. The interruptible-load price of energy is desirably the same as that for interruptible-load residential customers who are not on participating feeders.

e. Pay for Curtailment

Customers who choose to pay for energy under a fixed-price plan pay the same price per unit of energy at all times of day, week, month, and year, except when a request for curtailment is made, at which time the customer will be credited a curtailment price for the verified amount of load that has been curtailed. The fixed price of energy is desirably the same as that of residential customers in who are not on participating feeders. The curtailment price of energy is desirably the same as that of residential customers in who are not on participating feeders.

f. Direct-Load-Control Plan

Customers who choose to pay under a direct-load-control plan pay a discounted fixed price. The discount can be based on the annualized marginal cost of adding the capacity corresponding to the diversified controlled (not subscribed) load in the zone at the time of the coincident peak of the feeder to which the load is connected.

g. Load Control Override

Customers on the direct-load-control plan are permitted to override every load-control command when it is transmitted to their equipment, provided the customer repays the discount received for electricity during the month during which the override was employed.

To enable such a plan, every feeder's direct-load-control system is desirably tested on a periodic basis (e.g., for 15 minutes each month at a random day and time) to help ensure that (a) the system functions, and (b) customers are ready and willing to accept the conditions for which they are compensated. These load-control tests can be exempted from any load control limit. Customers who override a load-control test can be penalized in the same manner as if they have overridden an actual load-control event.

A customer's load-control system can be limited. For example, in one exemplary embodiment, no customer's load-control system can be controlled for more than a fixed time period during any single day (e.g., 4 hours on any single day), more than a fixed time period during any single week (e.g., 12 hours in any single week), or more than a fixed time period during any single month (e.g., 36 hours in any single month).

h. Time-of-Use Plans

Customers who choose to pay for energy under a time-of-use plan can be offered a two-tier on-peak/off-peak daily pricing schedule. The time-of-use prices can be computed and set seasonally based on a net revenue-neutral price for the aggregate annual customer load shape assuming the same consumption habits.

The use of a net-revenue-neutral objective is different from that which utilities often use for time-of-use plans. It is desirable for embodiments of the disclosed technology to use a time-of-use plan that is net-revenue neutral because the plan is motivated by utility cost savings on the supply side, which are shared with the customers who engage in time-of-use energy-saving behaviors. If the plan were gross-revenue neutral it would not share supply cost savings with the customers and instead increase utility revenues from customers who do not engage in time-of-use saving behavior, which is not desired.

In one particular implementation, the ratio of on-peak to off-peak prices under time-of-use plans is no less than 3:1. However, this ratio can vary depending on the implementation.

(1) Time-of-Use with No Automation

Customers who subscribe to the time-of-use pricing plan but do not have any load-control automation can be registered as such (e.g., TOU/M). The meter can collect on-peak and off-peak energy consumption separately, as well as hourly energy-consumption data to be made available to the customer for later download and viewing.

(2) Time-of-Use with Automation

Customers who subscribe to the time-of-use pricing plan and have at least one automated load-control system can be registered as such (e.g., TOU/A). The meter can collect on-peak and off-peak energy consumption separately, as well as hourly energy consumption data to be made available to the customer for later download and viewing.

(3) Time-of-Use with Critical Peak Price

Customers who subscribe to the time-of-use pricing plan with critical-peak-pricing can be registered as such regardless of whether they have automation for load control (e.g., TOU/MC or TOU/AC). The meter can collect on-peak and off-peak energy consumption separately, as well as hourly energy-consumption data to be made available to the customer for later download and viewing.

(4) Time-of-Use Price Determination

The on-peak and off-peak prices can be determined such that the gross revenue over the aggregate annual hourly residential-customer load shape is the same for both the fixed price and the time-of-use price.

i. Real-Time Price Plan

Customers who choose the real-time plan pay for energy using a price that is computed at a fixed interval (e.g., every 5 minutes) using the real-time price determination method.

(1) Real-Time Price with Declining Balance

Customers who subscribe to declining-balance plans can be recorded as such (e.g., RTP-D). Customers who are on prepaid plans can have a further suffix to denote the declining-balance plan (e.g., RTP-DP).

16. Interval Metering for the Disclosed Plans

Customer meters on participating feeders can measure the energy consumption as follows:

Fixed-price interval metering. Customers on the fixed-price plan can have periodic metering data (e.g., hourly metering data) uploaded periodically (e.g., at least once per month).

Direct-load-control interval metering. Customers on the direct-load-control plan can have periodic metering data (e.g., 15-minute metering data) uploaded periodically (e.g., at least once per month).

Time-of-use price interval metering. Customers on a time-of-use price plan can have periodic metering data (e.g., hourly metering data) uploaded periodically (e.g., at least once per month).

Real-time price interval metering. Customers on real-time price plan can have periodic metering data (e.g., five-minute-interval metering data) uploaded periodically (e.g., at least once per month).

17. Plan Portfolio

The target number of customers under each pricing plan can be determined using a portfolio-analysis method that optimizes the chosen business objective.

In the following subsections, exemplary business objectives and metrics for analyzing the business objectives are introduced.

a. Minimum Imbalance-Energy Cost

This objective can be used to help lower (or minimize) the mean imbalance-energy cost by controlling actual load to match the load that has been forecast. The mean value of the performance metric can be the mean of the periodic (e.g., five-minute) imbalance energy costs on the participating feeders over a suitable period of evaluation. The variance of the performance metric can be the variance of the imbalance energy costs on the participating feeders over the period of evaluation.

In one particular implementation, the method of calculating the imbalance energy cost is $$C_{imbalance} = P_{imbalance}(E_{expected} - E_{actual}) \quad (19)$$

where $C_{imbalance}$ is the imbalance energy cost (see feeder performance metrics data); $P_{imbalance}$ is the imbalance energy price (see feeder performance metrics data); $E_{expected}$ is the forecast day-ahead energy expected for the five-minute time interval (see feeder performance metrics data); and $E_{actual}$ is the actual day-ahead energy used for the 5-minute time-interval (see feeder performance metrics data).

b. Minimum Energy Cost

This objective can be used to help lower (or minimize) total energy cost, provided it is not guaranteed to minimize costs on any time scale other than that at which the real-time balance price is computed (e.g., 5 minutes). The mean value of the performance metric can be the mean of the ratio of the periodic (e.g., five minute) bulk energy cost to the five-minute nodal energy consumed for the participating feeders over the period of evaluation. The variance of the performance metric can be the variance, over the period of evaluation, of the ratio of the periodic (e.g., five minute) nodal energy cost to the periodic (e.g., five-minute) nodal energy consumed for the participating feeders.

In one particular implementation, the method of calculating the energy cost is $$C_{energy} = E_{actual} P_{settled} \quad (20)$$

where $C_{energy}$ is the actual energy cost (see feeder performance metrics data); $E_{actual}$ is the actual energy used (see feeder performance metrics data); and $P_{settled}$ is the settled energy price (see feeder performance metrics data).

c. Maximum Net Revenue

This objective can be used as an equivalent to minimum energy cost in cases where the customers and suppliers have roughly equal price response. The mean value of the performance metric can be the mean of the periodic (e.g., five-minute) net revenues on the participating feeders over a suitable period of evaluation. The variance of the performance metric can be the variance of the net revenue on the participating feeders over the period of evaluation.

In one particular implementation, the method of calculating net revenue is $$R_{net} = -C_{net} = R_{sales} + R_{fees} + R_{payback} - C_{energy} \quad (21)$$

where $R_{net}$ is the net revenue (see feeder performance metrics data); $C_{net}$ is the net cost (see feeder performance metrics data); $R_{sales}$ is the revenue from energy sales (see feeder performance metrics data); $R_{fees}$ is the revenue from fees (see feeder performance metrics data); $R_{payback}$ is the revenue from incentive paybacks (see feeder performance metrics data); and $C_{energy}$ is the cost of energy sold (see feeder performance metrics data).

d. Maximum Asset Utilization

This objective can be used to help increase (or maximize) distribution-asset utilitization on a feeder, provided the feeder has experienced constraints and expansion of the feeder is deferred. The mean value of the performance metric can be the mean asset utilization of the periodic (e.g., five-minute) net revenue on the constrained participating feeders over the period of evaluation. The variance of the performance metric can be the variance of the asset utilization on the constrained participating feeders over a suitable period of evaluation.

In one particular implementation, the asset utilization for an interval is estimated by computing the ratio of the energy delivered, $E_t$, to the feeder capacity, $P_t$, over the duration of the interval $\Delta_t$:

$$\alpha_t = \frac{E_t}{\Delta_t \rho P_t} \quad (22)$$

where $\rho$ is the constrained-feeder limit.

e. Minimum Carbon Emissions

This objective can be used to reduce (or minimize) carbon emissions, provided it is not guaranteed that emissions are minimized on any time scale other than that at which the system operates (e.g., five minutes). The mean value of the performance metric can be the mean, over a suitable period of evaluation, of the five-minute carbon-emissions estimates for participating feeders. The variance of the performance metric can be the variance, over the period of evaluation, of the carbon emissions estimated for the participating feeders.

In particular embodiments, the carbon emissions can be estimated by computing the PJM carbon emission in tons of $CO_2$ per MWh for each periodic (e.g., five-minute) interval during the period of evaluation.

18. Portfolio Analysis Method

The plan portfolio analysis can be performed using the Modern Portfolio Theory method, whereby the mean and variance of the chosen business objectives are computed for each mixture of plans.

In particular embodiments, the preferred strategy is the weighted mixture that achieves a desired performance level of the chosen business objective (e.g., the mixtures that optimizes the performance of the chosen business objective). For instance, the optimization can take the form of a maximization of the mean and/or a minimization of the variance, of the portfolio with respect to the chosen business objective.

According to one particular implementation, the expected mean performance of a plan mixture is:

$$x_{mix} = \sum_{i=1}^{N_{plans}} w_i x_i \quad (23)$$

where x is the expected performance of the ith plan, and $w_i$ is the fractional weight of the ith plan.

In this particular implementation, the expected variance of a plan mixture is $$\sigma_{mix}^2 = \sum_{i=1}^{N_{plans}} w_i \sigma_i \sum_{j=1}^{N_{plans}} w_j \sigma_j \rho_{ij} \quad (24)$$

where $\sigma_i^2$ is the variance of the expected performance of the ith plan, and $\rho_{ij}$ is the correlation coefficient between the performance of the ith and jth plans.

Historical data from a selected period of time (e.g., the previous three months) can be used to determine the correlation coefficients and performance of each plan. In the absence of historical data for a particular zone, the initial performance and correlation coefficient can be estimated using the GridLAB-D simulation model.

Figure 10:
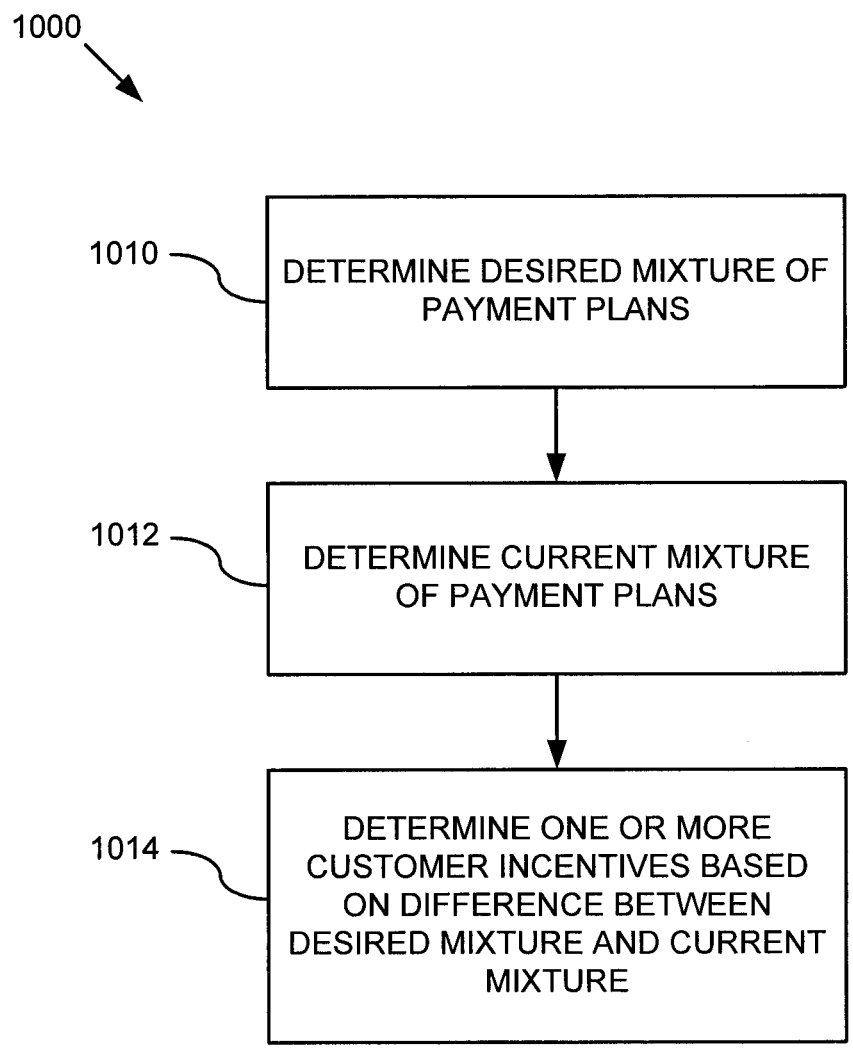
FIG. 10 is a flowchart for an exemplary method of determining customer incentives to achieve a desired mixture of customer payment plans.

A general embodiment of determining customer incentives according to the disclosed technology is shown in flowchart 1000 in FIG. 10.

At 1010, a desired mixture of electrical-power customer payment plans is determined. The desired mixture can be determined, for example, in accordance with one or more of the business objectives selected by a utility implementing the method. In general, the desired mixture includes a mixture of payment plan types for a particular customer base that produces a desired performance level that satisfies or helps satisfy the utility's selected business objectives.

At 1012, a current mixture of electrical-power customer payment plans is determined. This information, for example, can be input by the utility or obtained by accessing an appropriate customer database.

At 1014, one or more customer incentives are determined based on the difference between the desired mixture of electrical-power customer payment plans and the current mixture of electrical-power customer payment plans. The customer incentives can be designed to cause customers to change payment plans in accordance with the desired mixture, thereby resulting in an increased number of customers participating in an undersubscribed plan. As more fully discussed below, the degree of need for a particular customer incentive as well as how the customer incentive should change over time can be computed using an incentive model. The results from such an incentive model can be displayed on a display device. The customer incentives can be implemented using a variety of techniques. For example, in particular implementations, the customer incentives are implemented by providing the customers with a credit for those plans that contribute to the desired mixture of customer payment plans (e.g., undersubscribed plans) and charging the customers a fee for those plans that do not contribute to the desired mixture (e.g., oversubscribed plans).

The method of FIG. 10 can be repeated as desired in order to account for changes in the number of customers, changes in the desired business objectives, or other such factors.

a. Plan Incentive Control Terms

In one particular embodiment, the formula for the $i^{th}$ plan's incentive, $M_i$ at time t is:

$$M_{i,t+1} = K_P \varepsilon_i(t) + K_I \sum_{\tau=0}^{t} \varepsilon_i(t) \Delta t + K_D \frac{d}{dt} \varepsilon_i(t) \quad (25)$$

where $\varepsilon_i(t)$ is the actual number of subscribers $N_i$ less the desired number of subscribers $D_i$ to the $i^{th}$ plan; $K_P$ is the proportional control term; $K_I$ is the integral control term; and $K_D$ is the differential control term.

b. Initial Control Terms

In certain embodiments, the initial values of the control terms are chosen to minimize or achieve a desired value for the settling time of the GridLAB-D simulation.

c. Control-Term Tuning

Figure 11:
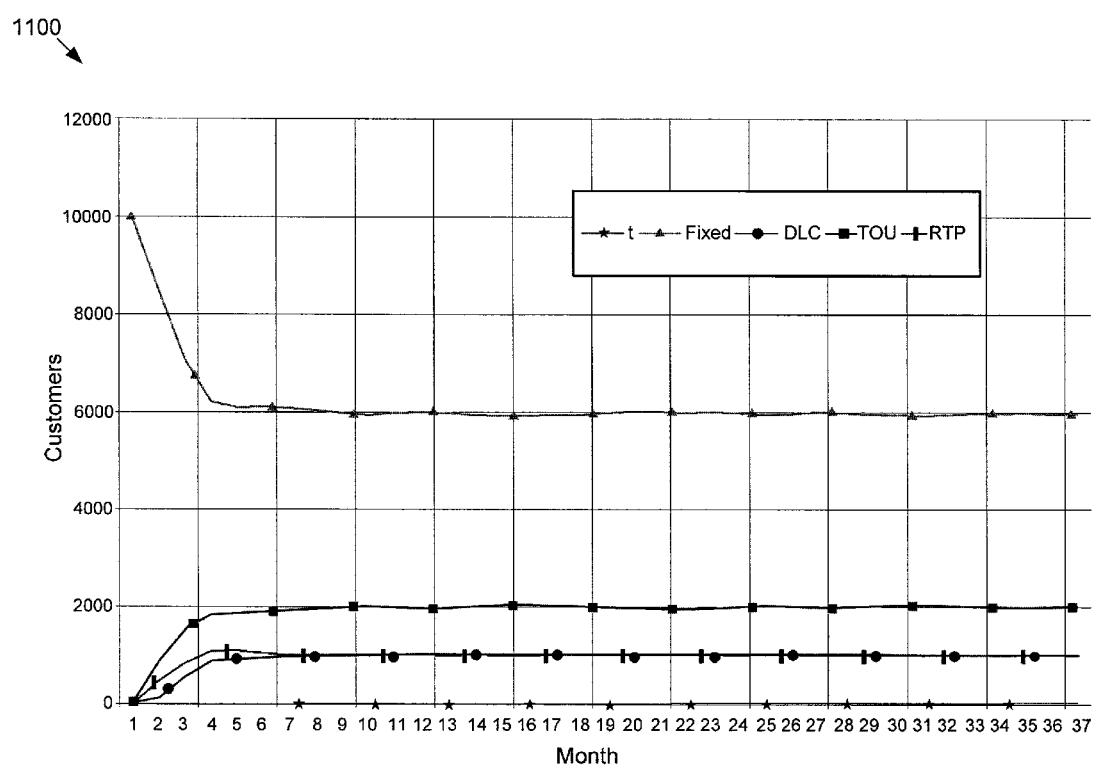
FIG. 11 is a graph illustrating how control terms can be adjusted according to an embodiment of the disclosed technology.

Tuning of the control terms can be performed using a variety of methods, but in one particular implementation is performed using the Ziegler-Nichols method, provided the final values for the control terms are fractionally reduced to avoid excessive oscillation before settling occurs, as illustrated in graph 1100 in FIG. 11.

A process can be performed to identify additional parameters by simulation (e.g., using the GridLAB-D simulation). For example, in one particular implementation, additional parameters are determined using the following method. Control terms are set to zero and $K_P$ is increased until a steady oscillation in the number of subscribers to each plan emerges ($K_C$ is the value of $K_P$ at which the oscillation become steady, and $P_C$ is the frequency of the oscillation that emerges). In one embodiment, the control terms can then be set such that $K_P=0.6K_C$, $K_I=2K_P/P_C$, and $K_D=K_P P_C/8$. Observe the simulation results and decrease the control terms until there is no overshoot and the time required to reach the desired number of subscribers is reduced using the following rules of thumb: decreasing $K_P$ will increase the initial response time, decrease the overshoot, not effect settling time, and increase the final error; decreasing $K_I$ will increase the response time, decrease the overshoot, increase settling time, and decrease the final error; decreasing $K_D$ will not affect the initial response time, will increase the overshoot, will increase the settling time, and will not effect the final error.

In certain implementations, the operators should recalibrate the simulation (e.g., GridLAB-D simulation model) periodically (e.g., every 6 months) and repeat the above procedure whether or not the fractional reductions of the control terms remain valid. If the number of subscribers to a particular plan changes, then the cumulative error term of ei(t) can be disabled for PC periods to include the new subscribers without incorporating the plan-change impulse into the integral control term.

d. Plan Selection Incentives

Customers can be offered financial incentives and fees to change plans that are necessary to achieve the desired plan portfolio. Said incentives can take the form, for example, of a sign-up fee for those plans that are oversubscribed, or credit for those plans that are undersubscribed, which can be applied to the billing cycle in which the plan change takes effect.

Credits and fees can be adjusted periodically (e.g., monthly) as necessary to sustain the business objective. In certain embodiments, the fixed-price plan has neither an incentive nor a fee associated with it.

19. Residential Energy Forecast

In certain embodiments of the disclosed technology, the incentive is calculated based on the adjusted expected energy consumption for the customer's home based on the heating and cooling degree hours in the typical meteorological year ("TMY").

The prepaid bill can be calculated by estimating the expected energy use under the fixed-price plan, given the customer's history of energy use under different weather conditions. For example, in one particular embodiment, for each prepaid customer and each month in the past n years (e.g., in the past 3 years), the total energy use, and the historical actual heating and cooling degree-hours can be computed. For months for which historical data is available, a least-squares fit of the heating ($E_{heat}$), cooling ($E_{cool}$), and base ($E_{base}$) energy consumption components can be made. In one particular implementation, the following equation is used:

$$E_{billed} = E_{heat}DH_{heat} + E_{cool}DH_{cool} + E_{base} \quad (26)$$

where $E_{billed}$ is the billed energy consumption of the home (in kWh); $DH_{heat}$ is the heating degree hours from the weather data (in ° F.h); and $DH_{cool}$ is the cooling degree hours from the weather data (in ° F.h).

The heating degree hours can be computed as $$DH_{heat} = \sum_{t=0}^{N_{hours}} (T_{h0} - T_{out}) \quad (27)$$

when $T_{out} < T_{h0}$ and the cooling degree hours are computed as $$DH_{cool} = \sum_{t=0}^{N_{hours}} (T_{c0} - T_{out}) \quad (28)$$

when $T_{out} > T_{c0}$, where $T_{h0}$ is the heating balance temperature of the home; and $T_{c0}$ is the cooling balance temperature of the home.

Figure 9:
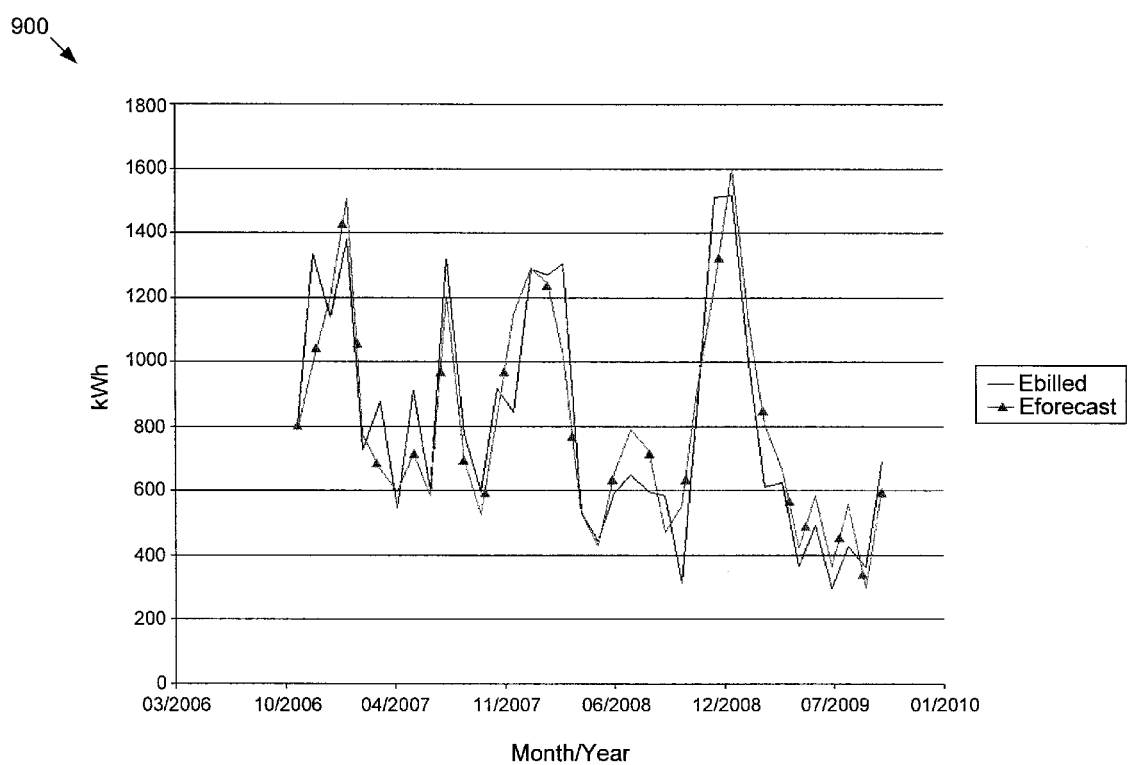
FIG. 9 is a graph illustrating an exemplary residential energy forecast technique.

The least-squares fit of the heating, cooling, and base energy components for the same historical months, an example of which is shown in graph 900 illustrated in FIG. 9, can be used with the TMY value to estimate the expected energy use of the next month, using the equation:

$$E_{expected} = \overline{E}_{heat}DH_{heat} + \overline{E}_{cool}DH_{cool} + \overline{E}_{base} \quad (29)$$

A weather adjustment can be applied at the end of the month to account for the discrepancy between the funds given according to the TMY weather and the funds needed for the actual heating and cooling degree-hours observed. Rather than deducing the error from the current month's forecast, the correction can be applied to the next month's forecast, thereby avoiding the appearance of taking something back that was already given.

20. Exemplary Bills for the Disclosed Plans a. Fixed-Price Plan Billing

Customers on the fixed-price plan can receive a bill that is identical to those received by customers on non-participating feeders. In certain embodiments, fixed-price bills can include the information in the following example:

TABLE 1

Example fixed-price plan bill
Example fixed price plan bill

| | Read dates | | | | Readings | | | |
|---|---|---|---|---|---|---|---|---|
| Meter no. | Previous | Present | Days | Rate | Previous | Present | Usage | Charges |
| 1582754 | Sep. 21, 2009 | Oct. 22, 2009 | 31 | 8.1 | 132785 | 134154 | 1369 | 110.89 |
| | | | | | Previous balance | | | 150.25 |
| | | | | | Payment on Sep. 30, 2009 | | | 124.62 |
| | | | | | Balance forward | | | 25.63 |
| | | | | | Monthly basic | | | 11.45 |
| | | | | | Energy charges | | | 110.89 |
| | | | | | Taxes | | | 9.18 |
| | | | | | Current charge | | | 131.52 |
| | | | | | Total amount due | | | 157.15 | b. Direct-Load-Control Billing

Customers on the direct load-control plan can receive a bill that is based on the number of kilowatthours used during the month, plus any penalties for overrides used during the month. In certain embodiments, direct-load-control bills can include the following:

TABLE 2

Example direct-load-control plan bill
Example direct load-control plan bill

| Meter no. | Read dates | | Days | Rate | Readings | | | Charges |
| --- | --- | --- | --- | --- | --- | --- | --- | --- |
| | Previous | Present | | | Previous | Present | Usage | |
| 1064696 | Sep. 21, 2009 | Oct. 22, 2009 | 31 | 7.1 | 182034 | 183403 | 1369 | 97.20 |
| | | | | | Previous balance | | | 128.75 |
| | | | | | Payment on Sep. 29, 2009 | | | 65.00 |
| | | | | | Balance forward | | | 63.75 |
| | | | | | Monthly basic | | | 11.45 |
| | | | | | Energy charges | | | 97.20 |
| | | | | | Override penalties | | | 15.00 |
| | | | | | Taxes | | | 8.15 |
| | | | | | Current charge | | | 131.80 |
| | | | | | Total amount due | | | 195.55 | c. Time-of-Use Plan Billing

Customers on the time-of-use plan can receive a bill that reflects the amount of energy used during on-peak hours, the amount of energy used during off-peak hours, and the respective price and charges. In certain embodiments, time-of-use plan bills can include the following:

TABLE 3

Example time-of-use plan bill
Example time-of-use plan bill

| Meter no. | Read dates | | Days | Rate | Readings | | | Charges |
| --- | --- | --- | --- | --- | --- | --- | --- | --- |
| | Previous | Present | | | Previous | Present | Usage | |
| 1559727 | Sep. 21, 2009 | Oct. 22, 2009 | 31 | 12.3 | 183861 | 185016 | 1155 | 142.07 |
| | | | | 4.1 | 107854 | 109387 | 1533 | 62.85 |
| | | | | | Previous balance | | | 162.89 |
| | | | | | Payment on Sep. 30, 2009 | | | 158.66 |
| | | | | | Balance forward | | | 4.23 |
| | | | | | Monthly basic | | | 11.45 |
| | | | | | Energy charges | | | 204.92 |
| | | | | | Taxes | | | 15.37 |
| | | | | | Current charge | | | 231.74 |
| | | | | | Total amount due | | | 235.97 | d. Real-Time Plan Billing

In certain embodiments, real-time plan bills can include the following:

TABLE 4

Example real-time plan bill
Example real-time plan bill

| Meter no. | Read dates | | Days | Rate | Readings | | | Charges |
| --- | --- | --- | --- | --- | --- | --- | --- | --- |
| | Previous | Present | | | Previous | Present | Usage | |
| 1978485 | Sep. 21, 2009 | Oct. 22, 2009 | 31 | <0.0 | 186945 | 186987 | 42 | −0.06 |
| | | | | 0.0 . . . 0.1 | 112487 | 113502 | 1015 | 0.70 |
| | | | | 0.1 . . . 1.0 | 118898 | 119412 | 514 | 0.45 |
| | | | | 1.0 . . . 10.0 | 189574 | 189764 | 190 | 13.07 |
| | | | | 10.0 . . . 100.0 | 153860 | 153964 | 104 | 65.45 |
| | | | | >100.0 | 127820 | 127858 | 38 | 34.28 |
| | | | | | Previous balance | | | 148.13 |
| | | | | | Payment on Sep. 21, 2009 | | | 124.20 |
| | | | | | Balance forward | | | 23.93 |
| | | | | | Monthly basic | | | 11.45 |
| | | | | | Energy charges | | | 113.89 |
| | | | | | Taxes | | | 9.40 |
| | | | | | Current charge | | | 134.74 |
| | | | | | Total amount due | | | 158.67 | e. No-Loss Credits

In certain embodiments, bills can additionally contain (a) the rolled-up charges under the chosen plans for the past 12 months, (b) the alternative charges under the fixed price plan, and/or (c) any credits applied as a result of excess charges under the chosen plan. For example:

TABLE 5

| Alternative energy charges section Alternative energy charges | |
|---|---|
| Total charges over last 12 months | $972.04 |
| Less incentives credited | $128.00 |

TABLE 5-continued

| Alternative energy charges section Alternative energy charges | |
|---|---|
| Actual net charges | $844.04 |
| Total energy usage over last 12 months | 12,767 kWh |
| Energy charges at 8.1 ¢/kWh | $1,034.13 |
| Your actual savings over the last 12 months | $190.26 |
| Credit for alternative energy charges | $0.00 | f. Declining-Balance Accounts

In certain embodiments, a real-time plan bill with a declining balance account includes the following information:

TABLE 6

Example real-time plan bill with declining balance account
Example real-time plan bill with declining balance account

| Meter no. | Read dates | | Days | Rate | Readings | | Usage | Charges |
| | Previous | Present | | | Previous | Present | | |
|---|---|---|---|---|---|---|---|---|
| 1978485 | Sep. 21, 2009 | Oct. 22, 2009 | 31 | <0.0 | 186945 | 186987 | 42 | −0.06 |
| | | | | 0.0 ... 0.1 | 112487 | 113502 | 1015 | 0.70 |
| | | | | 0.1 ... 1.0 | 118898 | 119412 | 514 | 0.45 |
| | | | | 1.0 ... 10.0 | 189574 | 189764 | 190 | 13.07 |
| | | | | 10.0 ... 100.0 | 153860 | 153964 | 104 | 65.45 |
| | | | | >100.0 | 127820 | 127858 | 38 | 34.28 |
| | | | | | Previous account balance | | | 148.13 |
| | | | | | Monthly basic | | | 11.45 |
| | | | | | Energy charges | | | 113.89 |
| | | | | | Taxes | | | 9.40 |
| | | | | | Current charge | | | 134.74 |
| | | | | | Current account balance | | | 13.39 | g. Incentives

In certain embodiments, an incentive offering can providing the following information:

TABLE 7

Example incentives offering
Example incentive offering
This month, you are being offered the following incentives to change which plan you subscribe to. The offer expires on Nov. 15, 2009. If you change to a plan that has an incentive, you will receive a credit on next month's bill for that amount. If you change to a plan without an incentive, you will not receive any credit

| Plan | Description | Incentive | Estimated bill last month |
|---|---|---|---|
| Fixed | You would pay 8.1 ¢/kWh no matter when you use electricity. | none | $124.23 |
| ILC | You would pay 4.7 ¢/kWh no matter when you use electricity, but you allow the utility to disconnect you for up to 12 hours in any given month, with at least 24 hour notice. | none | $68.87 |
| DLC | You would pay 6.7 ¢/kWh no matter when you use electricity, but you allow the utility to turn off your large electric loads for up to 4 hours in any one day, up to 12 hours in any one week, and up to 36 hours in any single month. | none | $97.12 |
| PFC | You would pay 8.1 ¢/kWh no matter when you use electricity, but the utility will give you a credit of $25 for any critical-peak day that you keep your load below 20 kWh. | $5 | $124.23 |
| TOU | You currently pay 4.1 ¢/kWh during off-peak hours and you pay 12.1 ¢/kWh during on-peak hours (M-F 3 pm-9 pm). | Since Sep. 18, 2008 | $118.45 |
| TOU/C | You would pay 3.9 ¢/Kwh during off-peak hours, 11.6 ¢/kWh during on-peak hours (M-F 3 pm-9 pm), and 35.0 ¢/kWh during critical-peak times, with 24 hours notice. | $5 | $107.19 |

TABLE 7-continued

Example incentives offering
Example incentive offering
This month, you are being offered the following incentives to change which plan you subscribe to. The offer expires on Nov. 15, 2009. If you change to a plan that has an incentive, you will receive a credit on next month's bill for that amount. If you change to a plan without an incentive, you will not receive any credit

| Plan | Description | Incentive | Estimated bill last month |
|---|---|---|---|
| RTP | You would pay the true cost of electricity delivery to your home. | $10 | $62.87 |
| RTP/D | You would pay the true cost of electricity delivery to your home from a prepaid incentive account. | $15 | $62.87 |

**Indicates your current plan.

In view of the many possible embodiments to which the principles of the disclosed technology may be applied, it should be recognized that the illustrated embodiments are only preferred examples of the invention and should not be taken as limiting the scope of the disclosed technology. Rather, the scope of the disclosed technology is defined by the following claims. We therefore claim as our invention all that comes within the scope and spirit of these claims and their equivalents.

What is claimed is:

1. A method, comprising:
receiving a first plurality of requests for electrical power from a corresponding first plurality of electrical-power users, wherein the first plurality of electrical-power users receive electrical power through a first feeder network controlled by a first transmission node of an electrical power distribution network, wherein each of the first plurality of requests indicates a requested quantity of electrical power and a requested price for the requested quantity of electrical power, and wherein one or more of the first plurality of requests for electrical power are associated with price-responsive electrical devices;
receiving a second plurality of requests for electrical power from a corresponding second plurality of electrical-power users, wherein the second plurality of electrical-power users receive electrical power through a second feeder network controlled by a second transmission node of the electrical power distribution network, wherein each of the second plurality of requests indicates a requested quantity of electrical power and a requested price for the requested quantity of electrical power, and wherein one or more of the second plurality of requests for electrical power are associated with price-responsive electrical devices;
receiving a plurality of offers for supplying electrical power to the first and second feeder networks, the plurality of offers being from a corresponding plurality of resource suppliers, wherein each of the plurality of offers indicates an offered quantity of electrical power and an offered price for the requested quantity of electrical power;
by computing hardware associated with the first feeder network, determining a first common price at which electrical power is to be supplied to the first plurality of electrical-power users on the first feeder network based at least in part on the requested prices and the offered prices of the first plurality of requests, the first determined common price being unique to the first feeder network;
by computing hardware associated with the second feeder network, determining a second common price at which electrical power is to be supplied to the second plurality of electrical-power users on the second feeder network based at least in part on the requested prices and the offered prices of the second plurality of requests, the second determined common price being unique to the second feeder network;
altering the electrical loads on the first and second feeder networks by transmitting the value of the determined first common price to the first plurality of electrical-power users on the first feeder network and transmitting the value of the determined second common price to the second plurality of electrical-power users on the second feeder network, and causing the price-responsive electrical devices to automatically adjust their power consumption in response to the values of the first and second determined common prices; and
transmitting power from the first feeder network to the second feeder network or transmitting power from the second feeder network to the first feeder network.

2. The method of claim 1, wherein the acts of receiving the plurality of requests, receiving the plurality of offers, and determining are repeated at periodic intervals.

3. The method of claim 2, further comprising transmitting a bid for electrical power to a higher-order transmission node, the bid indicating a quantity of power to be supplied to the electrical-power users and a requested price for the quantity of power.

4. The method of claim 3, wherein the periodic intervals are first periodic intervals, and wherein the act of transmitting the bid for electrical power to the higher-order transmission node is repeated at second periodic intervals, the second periodic intervals being longer than the first periodic intervals.

5. The method of claim 2, wherein the periodic intervals are intervals of 10 minutes or less.

6. The method of claim 1, wherein one or more of the offers for supplying electrical power are from one or more other transmission nodes that control one or more other feeder networks through which electrical-power users receive electrical power.

7. The method of claim 1, wherein one or more of the requests for electrical power are from one or more other transmission nodes that control one or more other feeder networks through which electrical-power users receive electrical power.

8. The method of claim 1, further comprising transmitting an offer to supply electrical power or a request for electrical power to one or more other transmission nodes that control one or more other feeder networks through which electrical-power users receive electrical power.

9. The method of claim 1, wherein one or more of the offers for supplying electrical power are from power resources in one or more electrical vehicles.

10. The method of claim 1, wherein one or more of the offers for supplying electrical power are associated with reserve power generators connected to the first or second transmission nodes.

11. The method of claim 1, further comprising transmitting the value of the determined first common price or the value of the determined second common price to at least one of the resource suppliers.

12. The method of claim 1, wherein the computing hardware is a computer processor or an integrated circuit.

13. The method of claim 1, wherein the method further comprises, by computing hardware associated with a respective one of the price-responsive electrical devices:
receiving the determined price;
comparing the determined price to the requested price for the respective one of the price-responsive electrical devices; and
generating a control signal for selectively operating or shutting off the respective one of the price-responsive electrical devices based on the comparison.

14. One or more non-transitory computer-readable media storing computer-readable instructions for causing one or more computers to perform a method, the method comprising:
receiving a first plurality of requests for electrical power from a corresponding first plurality of electrical-power users, wherein the first plurality of electrical-power users receive electrical power through a first feeder network controlled by a first transmission node of an electrical power distribution network, wherein each of the first plurality of requests indicates a requested quantity of electrical power and a requested price for the requested quantity of electrical power, and wherein one or more of the first plurality of requests for electrical power are associated with price-responsive electrical devices;
receiving a second plurality of requests for electrical power from a corresponding second plurality of electrical-power users, wherein the second plurality of electrical-power users receive electrical power through a second feeder network controlled by a second transmission node of the electrical power distribution network, wherein each of the second plurality of requests indicates a requested quantity of electrical power and a requested price for the requested quantity of electrical power, and wherein one or more of the second plurality of requests for electrical power are associated with price-responsive electrical devices;
receiving a plurality of offers for supplying electrical power to the first and second feeder networks, the plurality of offers being from a corresponding plurality of resource suppliers, wherein each of the plurality of offers indicates an offered quantity of electrical power and an offered price for the requested quantity of electrical power;
determining a first common price at which electrical power is to be supplied to the first plurality of electrical-power users on the first feeder network based at least in part on the requested prices and the offered prices of the first plurality of request, the first determined common price being unique to the first feeder network;
determining a second common price at which electrical power is to be supplied to the second plurality of electrical-power users on the second feeder network based at least in part on the requested prices and the offered prices of the second plurality of request, the second determined common price being unique to the second feeder network;
altering the electrical loads on the first and second feeder networks by transmitting the value of the determined first common price to the first plurality of electrical-power users on the first feeder network and transmitting the value of the determined second common price to the second plurality of electrical-power users on the second feeder network, and causing the price-responsive electrical devices to automatically adjust their power consumption in response to the values of the first and second determined common prices; and
transmitting power from the first feeder network to the second feeder network or transmitting power from the second feeder network to the first feeder network.

15. The one or more computer-readable media of claim 14, wherein the acts of receiving the plurality of requests, receiving the plurality of offers, and determining are repeated at periodic intervals.

16. The one or more computer-readable media of claim 15, wherein the method further comprises transmitting the value of the determined first common price or the value of the determined second common price to at least one of the resource suppliers.

17. The one or more computer-readable media of claim 15, wherein the method further comprises transmitting a bid for electrical power to a higher-order transmission node, the bid indicating a quantity of power to be supplied to the electrical-power users and a requested price for the quantity of power.

18. The one or more computer-readable media of claim 17 wherein the periodic intervals are first periodic intervals, and wherein the act of transmitting the bid for electrical power to the higher-order transmission node is repeated at second periodic intervals, the second periodic intervals being longer than the first periodic intervals.

19. The one or more computer-readable media of claim 14, wherein one or more of the offers for supplying electrical power are from one or more other transmission nodes that control one or more other feeder networks through which electrical-power users receive electrical power.

20. The one or more computer-readable media of claim 14, wherein one or more of the requests for electrical power are from one or more other transmission nodes that control one or more other feeder networks through which electrical-power users receive electrical power.

21. The one or more computer-readable media of claim 14, wherein the method further comprises transmitting an offer to supply electrical power or a request for electrical power to one or more other transmission nodes that control one or more other feeder networks through which electrical-power users receive electrical power.

22. The one or more computer-readable media of claim 14, wherein one or more of the offers for supplying electrical power are from power resources in one or more electrical vehicles.

23. The one or more computer-readable media of claim 14, wherein one or more of the offers for supplying electrical power are associated with reserve power generators connected to the first or second transmission nodes.

24. The one or more computer-readable media of claim 15, wherein the periodic intervals are intervals of 10 minutes or less.

* * * * *